(12) United States Patent
Fukumoto

(10) Patent No.: US 8,160,784 B2
(45) Date of Patent: Apr. 17, 2012

(54) OPERATION PARAMETER DISPLAY SYSTEM FOR WORKING VEHICLE FITTED WITH WORKING IMPLEMENT

(75) Inventor: Toshiya Fukumoto, Takarazuka (JP)

(73) Assignee: Kubota Corporation, Osaka (JP)

( * ) Notice: Subject to any disclaimer, the term of this patent is extended or adjusted under 35 U.S.C. 154(b) by 790 days.

(21) Appl. No.: 12/236,134

(22) Filed: Sep. 23, 2008

(65) Prior Publication Data
US 2009/0248258 A1 Oct. 1, 2009

(30) Foreign Application Priority Data
Mar. 31, 2008 (JP) .................................. 2008-090313

(51) Int. Cl.
*A01C 15/00* (2006.01)
*G06F 19/00* (2006.01)
(52) U.S. Cl. ......................................................... 701/50
(58) Field of Classification Search .................. 37/348, 37/466, 382, 413, 414, 415; 172/2–11; 701/50, 701/116, 207, 213–216, 300, 51, 60; 180/338, 180/364, 53.1, 369; 280/446.1; 475/204, 475/216
See application file for complete search history.

(56) References Cited

U.S. PATENT DOCUMENTS

| | | | | |
|---|---|---|---|---|
| 4,630,685 A | * | 12/1986 | Huck et al. | 172/7 |
| 5,951,613 A | * | 9/1999 | Sahm et al. | 701/50 |
| 7,832,520 B2 | * | 11/2010 | Murakami et al. | 180/338 |

FOREIGN PATENT DOCUMENTS

| | | |
|---|---|---|
| JP | 05-056705 A | 3/1993 |
| JP | 06245601 A | 9/1994 |
| JP | 2000-356164 A | 12/2000 |
| JP | 2005-24320 A | 1/2005 |
| JP | 2005218386 A | 8/2005 |

* cited by examiner

*Primary Examiner* — Robert Pezzuto
(74) *Attorney, Agent, or Firm* — The Webb Law Firm

(57) ABSTRACT

An operation parameter display system for a working vehicle (1) fitted with a working implement (3) includes a parameter setting controller (475) setting a group of operation parameters appropriate for the working implement (3) and the working vehicle (1) for each state of an operation executed by the working vehicle (1) in response to an operation input from a manual operation input device (200). A parameter recording controller (476) stores the group of operation parameters set by the parameter setting controller (475) in a memory (477) in response to the operation input from the operation input device (200). A parameter display controller (479) displays the group of parameters stored in the memory (477) on a display device (101) in response to the operation input from the operation input device (200).

4 Claims, 14 Drawing Sheets

OPERATION PARAMETER DISPLAY SYSTEM FOR WORKING VEHICLE FITTED WITH WORKING IMPLEMENT

BACKGROUND OF THE INVENTION

1. Field of the Invention

The present invention relates to an operation parameter display system displaying groups of operation parameters for an working implement and an working vehicle, which are set for each state of an working operation performed by the working vehicle fitted with the working implement.

2. Description of the Related Art

Tractors, ride-on rice transplanters, and other working vehicles are equipped with a system displaying operation parameters such as a vehicle speed and an engine speed, etc. on a display panel provided in an on-board driving section, and such a display system is known from, for example, JP 2005-24320A. In a case wherein a prescribed operating state appropriate for an working operation is achieved through, for example, a speed change operation performed with respect to a speed-change device for driving or a speed-change device for operating while performing the working operation, one mode of use of this display system involves an operator, for example, confirming a displayed operation condition (that is, a group of operation parameters) of the speed-change device for driving or the speed-change device for operating at that time and, as an operation parameter for subsequently achieving that operating state, either personally remembering the condition or writing the condition on note paper and attaching the note paper to a chassis. During a subsequent working operation, therefore, the operator can easily and rapidly achieve the prescribed operating state appropriate for the working operation by operating, for example, the speed-change device for driving or the speed-change device for operating as personally remembered or as written on the note paper.

However, as tractors, ride-on rice transplanters, and other working vehicles have a low frequency of use, the probability of personal memory becoming ambiguous is high in a case wherein personal memory is to be relied upon in order to achieve the prescribed operating state. In addition, in a case wherein the condition is written on note paper and the note paper is attached to the chassis, the probability of loss of the note paper is high. Thus, in a case wherein personal memory has become ambiguous or the note paper has been lost, the speed-change device for driving or the speed-change device for operating is operated by trial and error in order to achieve the prescribed operating state, and as a result, operating efficiency and finishing precision can be impaired.

SUMMARY OF THE INVENTION

It is an object of the present invention to provide a system capable of reliably, easily, and quickly setting operation parameters for various states of operations performed by an working vehicle and an working implement in unison such that the various operation states can be optimized as much as possible.

In order to accomplish this object, an working vehicle fitted with an working implement is provided with an operation parameter display system comprising a parameter setting means setting a group of operation parameters appropriate for the working implement and the working vehicle for each state of an operation executed by the working vehicle in response to an operation input from a manual operation input device, a parameter recording means storing the set group of operation parameters in a memory in response to an operation input from the operation input device, and a parameter display control means displaying the group of parameters stored in the memory on a display device in response to an operation input from the operation input device.

With this system, when a desired operation state has been achieved during an working operation, operation parameters required for achieving that operation state are set using the parameter setting means and stored in a memory as a group of operation parameters. Then, in a case wherein it is subsequently necessary to achieve the desired operation state, the group of operation parameters required for achieving that operation state are read from the memory and displayed on the display device. Consequently, by setting the working vehicle and the working implement in accordance with the displayed group of operation parameters, the desired operation state can be reliably, easily, and quickly achieved.

In a preferred embodiment of the present invention, the parameter recording means stores the group of operation parameters in the memory categorized for different operation states, and the parameter display control means displays the group of operation parameters on the display device categorized for different operation states. As a result of this feature, when performing working operations on a plurality of work surfaces with differing conditions such as soil hardness, etc., a group of operation parameters required for achieving the desired operation state appropriate for each of the operation surfaces with differing conditions can be stored in the memory. For example, when performing operations that vary based on timing such as double cropping, a group of operation parameters required for achieving the desired operation state appropriate for each of the timing-specific operations can be stored in the memory, and when cultivating different crops, a group of operation parameters required for achieving the desired operation state appropriate for each of the crop-specific operations can be stored in the memory. Then, when it is necessary to again achieve the desired operation state during subsequent operations, the group of operation parameters required for achieving that operation state can be read from the memory and displayed on the display device. As the group of operation parameters for recreating the operation state appropriate for the operation to be performed are set based on the group of operation parameters displayed for the operation state, an optimum operation state for the operation can be reliably, easily, and quickly achieved. Regardless of differences in work surface conditions, operation timing, crop type, or operation content, therefore, the working implement and the working vehicle can be operated in a prescribed operation states appropriate for each thereof.

In a more-specific preferred embodiment of the present invention, the group of operation parameters includes a parameter related to a vehicle speed of the working vehicle and a parameter related to driving of the working implement. It is often the case with regard to operations performed using an working vehicle fitted with an working implement that drive speeds such as a relocation speed of the working vehicle and a rotation speed of the working implement, etc. constitute critical parameters for achieving an ideal operation state. Accordingly, by recording a group of such operation parameters in memory, it becomes possible to recreate the ideal operation state and to realize favorable operation results. That is to say, by recreating drive parameters specifying operation states that produce ideal operation results, such as the vehicle speed of the working vehicle and the drive speed of the working implement, etc., it is possible to drive the vehicle at a speed identical to that of a previously-executed ideal operation and to drive the working implement at a drive speed identical to that of the previously-executed ideal operation, and therefore, satisfactory operation results can always be achieved.

Furthermore, in a case wherein the working implement is provided so as to be capable of vertical motion with respect to the working vehicle, it is preferable that the group of operation parameters also includes a parameter related to the vertical motion of the working implement. Consequently, by storing parameters relating to the vertical motion of the working implement such as height from the ground thereof during operations in the memory, a desired operation state wherein the working implement is positioned at a height identical to that of a previous operation can be reliably, easily, and quickly achieved.

In addition, in a case wherein the working implement is provided so as to be capable of rolling with respect to the working vehicle, it is preferable that the group of operation parameters also includes a parameter related to the rolling of the working implement. Consequently, by storing parameters relating to the rolling of the working implement such as orientation thereof with respect to the ground surface in a direction of rolling in the memory, a desired operation state wherein the working implement is oriented with respect to the ground surface in an identical manner to that of a previous operation can be reliably, easily, and quickly achieved.

As a further preferred embodiment of the present invention, if conventional constituent elements in an working vehicle can be used also as an operation input device or a display device, or in other words, if addition of software alone is sufficient to realize the above-explained functionality, the present invention can be achieved with minimum increase in cost and design complexity.

Other features and advantages of the present invention will hereinafter be clarified through explanation of preferred embodiments with reference to the figures below.

DETAILED DESCRIPTION OF THE PREFERRED EMBODIMENTS

Figure 1:
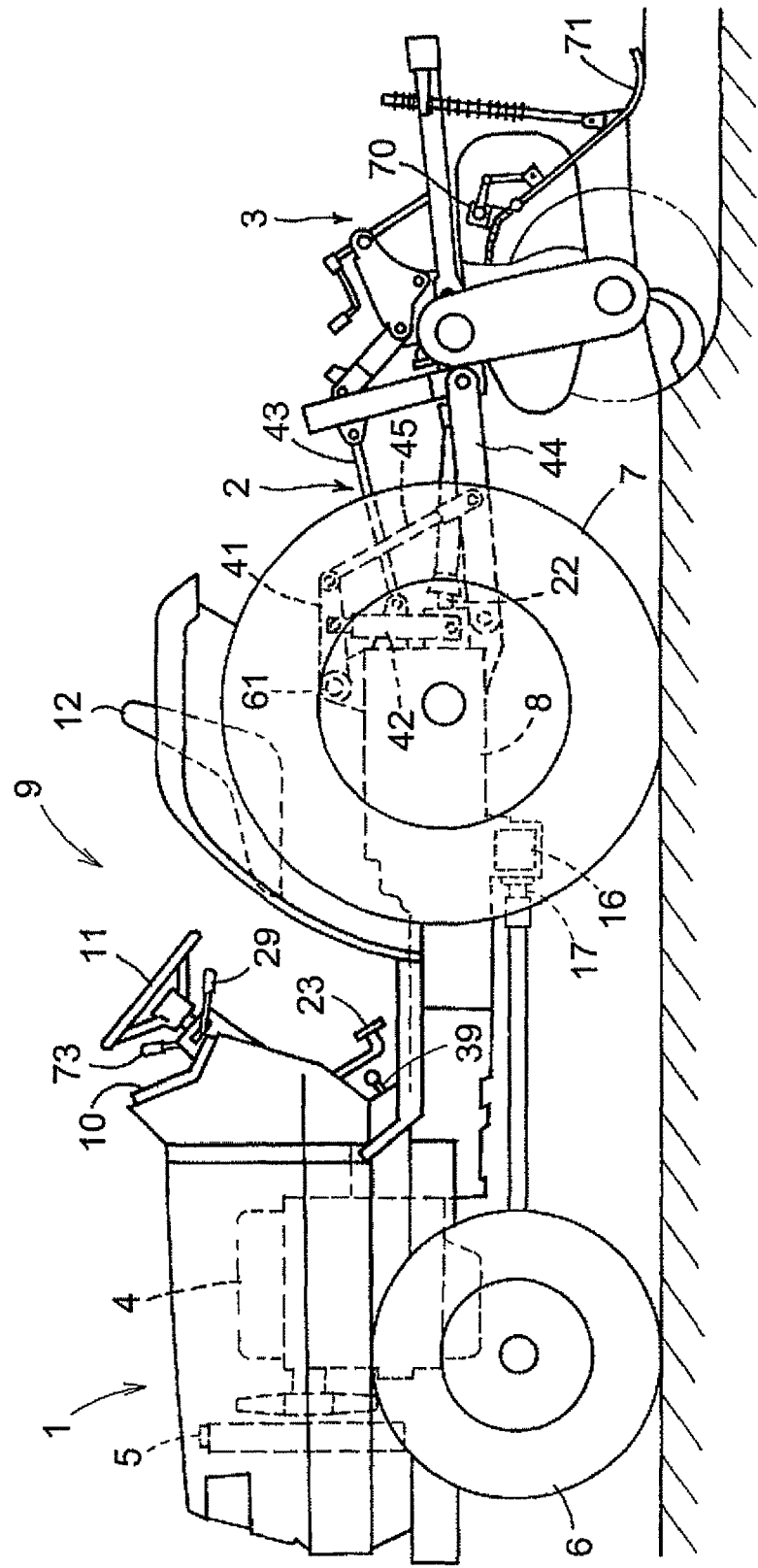
FIG. 1 is a full side view of an working vehicle for a tiling operation.

Hereinafter, as an example of a best means for carrying out the present invention, an embodiment of an operation parameter display system according to the present invention mounted on a tractor 1 is explained with reference to drawings. FIG. 1 is a full side view of the tractor 1 whereon a rotary tilling device 3 is mounted as an working implement. The rotary tilling device 3, constituting an example of an working implement, is connected to the tractor 1 at a rear section thereof via a link mechanism 2 so as to be capable of vertical motion and rolling. It should be noted that, although not shown in the figure, a soil-puddling device can be connected in place of the rotary tilling device 3 at the rear section of the tractor 1 in order to change the tractor 1 to a soil-puddling specification. Furthermore, a chemical distribution device can be connected in place of the rotary tilling device 3 at the rear section of the tractor 1 in order to change the tractor 1 to a chemical distribution specification.

Figure 2:
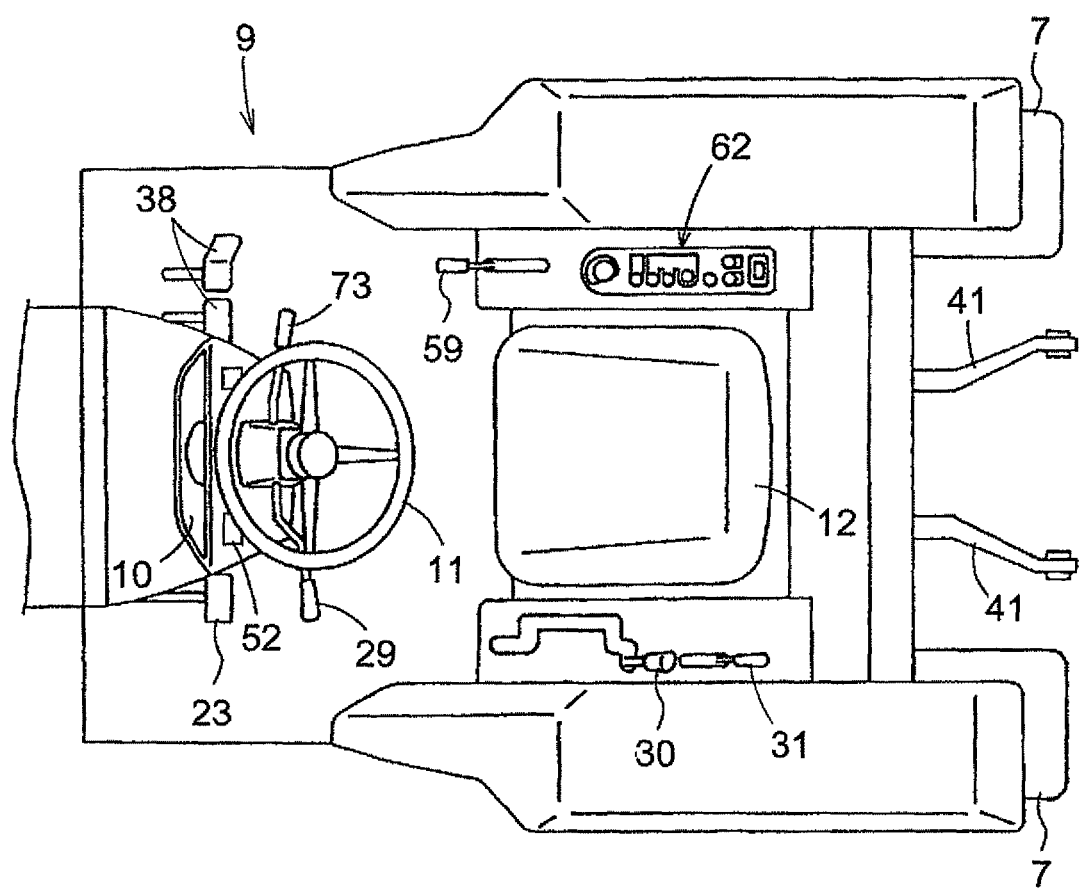
FIG. 2 is a plan view of an on-board driving section.

A water-cooled engine 4 and a radiator 5, etc. are mounted on the tractor 1 at a front section thereof, and a pair of left and right front wheels 6, etc. is also provided. At the rear section of the tractor 1, a transmission case (hereinafter, abbreviated as a "T/M case") 8 also serving as a rear frame and a pair of left and right rear wheels 7, etc. are provided, and in addition, an on-board driving section 9 is formed. As shown in FIG. 1 and FIG. 2, a display panel 10 displaying information such as an engine speed and a steering wheel 11 for steering of the front wheels, etc. are provided at a front section of the on-board driving section 9, and a driving seat 12, etc. is provided at a rear section of the on-board driving section 9.

Figure 3:
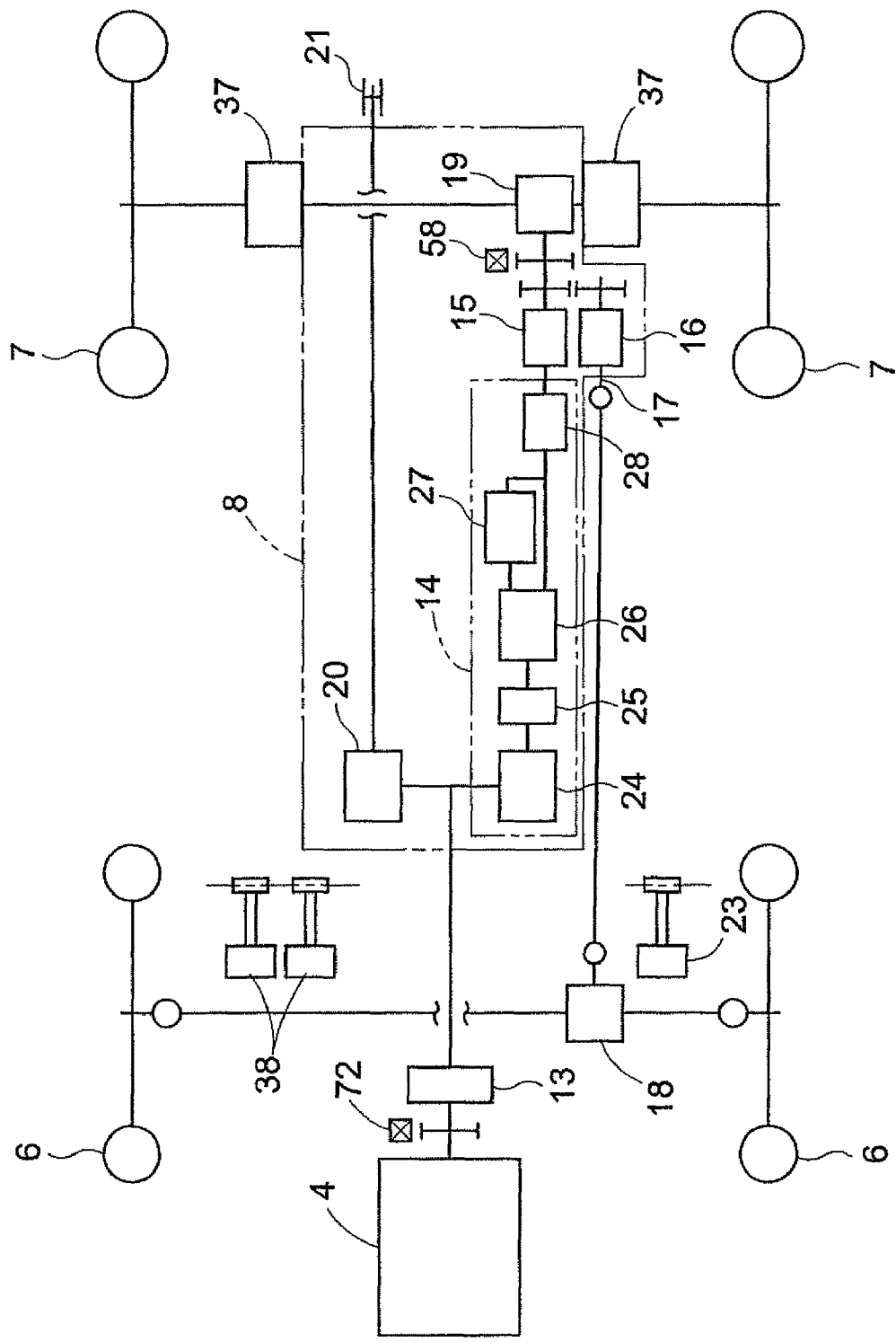
FIG. 3 is a schematic plan view showing a transmission configuration of a tractor.

As shown in FIG. 2 and FIG. 3, motive energy from the engine 4 is transferred to an interior of the T/M case 8 via a main clutch 13, etc. and is separated into motive energy for driving and motive energy for operating in the interior of the T/M case 8. The motive energy for driving is subjected to a speed change by a main speed-change device 14 and an auxiliary speed-change device 15, and thereafter, is separated into motive energy for front-wheel drive and motive energy for rear-wheel drive. The motive energy for front-wheel drive can be taken from a front-wheel power take-off shaft 17 via a front-wheel transmission selection device 16 and is transferred from the front-wheel power take-off shaft 17 to the left and right front wheels 6 via a front-wheel differential device 18, etc. The motive energy for rear-wheel drive is transferred to the left and right rear wheels 7 via a rear-wheel differential device 19, etc. The motive energy for operating can be taken from an operating-power take-off shaft 21 via an operating-power speed change device 20 and is transferred from the operating-power take-off shaft 21 to the rotary tilling device 3 via a shaft-transfer type external transfer mechanism 22.

The main clutch 13 is switched from an On condition wherein motive energy from the engine 4 is transferred to the interior of the T/M case 8 to an Off condition wherein the motive energy is cutoff as a result of a foot depression operation of a main clutch pedal 23 provided in a left foot space of the on-board driving section 9, and the main clutch 13 is switched from the Off condition to the On condition pursuant to release of the by-foot depression of the main clutch pedal 23. As shown in FIG. 3, the main speed-change device 14 comprises a hydraulic operation type first speed change mechanism 24 performing a four-stage speed change of the motive energy from the engine 4, a hydraulic type auxiliary clutch 25 disconnecting and connecting the motive energy having been subjected to a speed change by the first speed change mechanism 24, a forward/reverse selection mechanism 26 switching the motive energy from the auxiliary clutch 25 between forward-rotation motive energy and reverse-rotation motive energy, a hydraulic operation type second speed change mechanism 27 performing a two-stage, high/low speed change of the forward-rotation motive energy from the forward/reverse selection mechanism 26, and a hydraulic operation type third speed change mechanism 28 performing a two-stage, high/low speed change of the forward-rotation motive energy having been subjected to a speed change operation by the second speed change mechanism 27 or the reverse-rotation motive energy from the forward/reverse selection mechanism 26, etc. A neutral-return type forward/reverse selection lever 29 is provided below and to the left of the steering wheel 11, a main speed change lever 30 is provided to the left of the driving seat 12 and is capable of maintaining a position thereof, and the forward/reverse selection lever 29 and the main speed change lever 30 are operationally linked via a hydraulic control system such that forward/reverse selection, 12-stage speed change operations for forward travel, and 8-stage speed change operations for reverse travel can be performed a result of hydraulic pressure control based on an operation of the forward/reverse selection lever 29 and the main speed change lever 30.

The auxiliary speed-change device 15 is a hydraulic operation device using hydraulic pressure control to perform a three-stage speed change of the motive energy having been subjected to a speed change by the main speed-change device 14. Furthermore, the auxiliary speed-change device 15 is operationally linked via a hydraulic control system with an auxiliary speed change lever 31 provided behind the forward/reverse selection lever 29 and capable of maintaining a position thereof in order that the hydraulic control of the auxiliary speed-change device 15 can be performed based on an operation of the auxiliary speed change lever 31.

Figure 4:
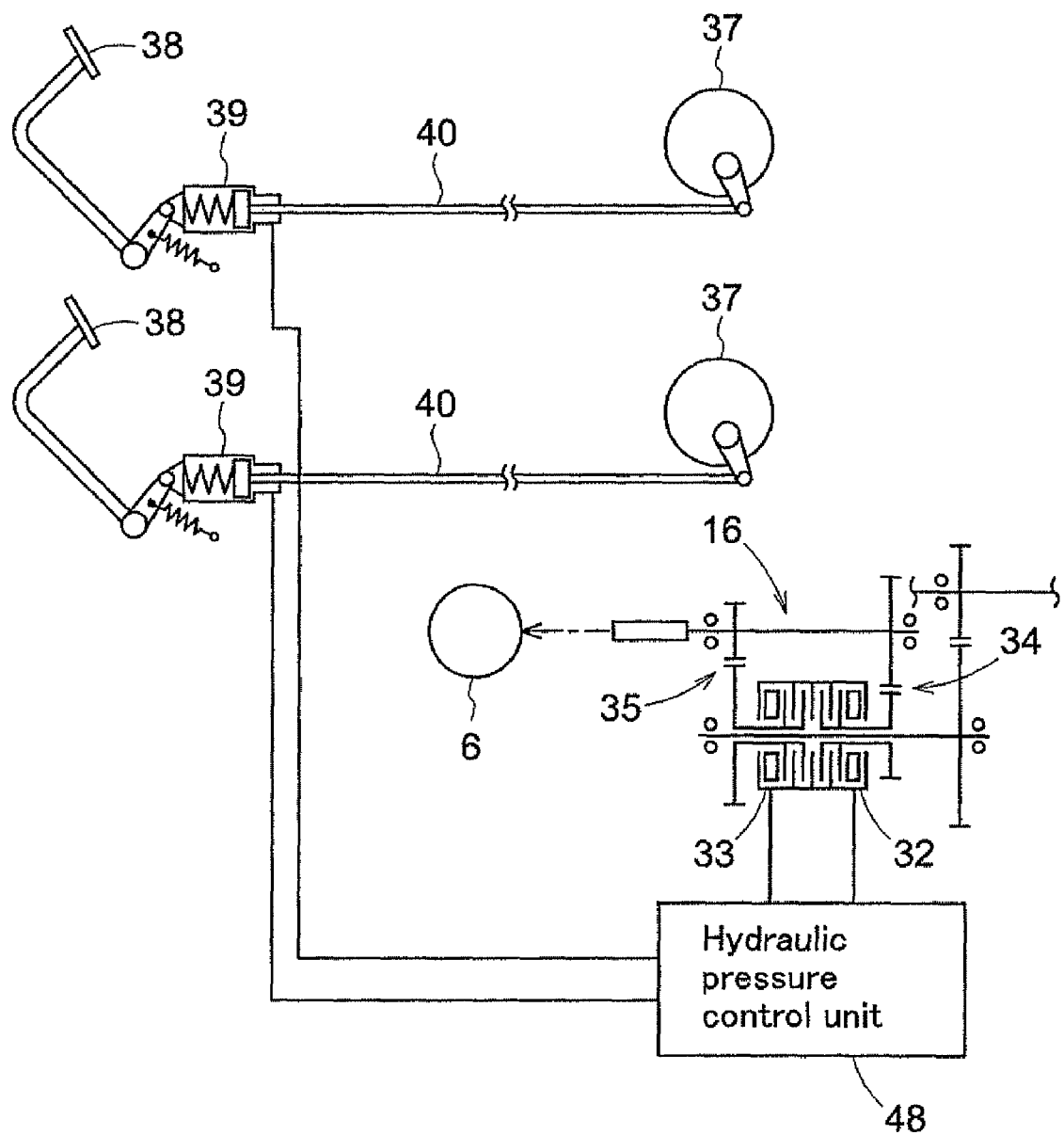
FIG. 4 is a hydraulic circuit diagram showing an operation configuration of a side brake and a transmission cutoff device.

As shown in FIG. 4, the transmission selection device 16 comprises a constant velocity clutch 32 and an acceleration clutch 33 disconnecting and connecting transmission from the auxiliary speed-change device 15 to the left and right front wheels 6, a gear-type constant velocity transfer mechanism 34 performing a speed change of motive energy from the constant velocity clutch 32 such that a peripheral speed of the left and right front wheels 6 becomes equal to a peripheral speed of the left and right rear wheels 7, and a gear-type acceleration transfer mechanism 35 performing a speed change of motive energy from the acceleration clutch 33 such that the peripheral speed of the left and right front wheels 6 becomes approximately twice the peripheral speed of the left and right rear wheels 7, etc. A multi-plate type hydraulic clutch is employed as each of the constant velocity clutch 32 and the acceleration clutch 33. Consequently, when the transmission selection device 16 switches both the constant velocity clutch 32 and the acceleration clutch 33 to an Off condition via hydraulic control, transfer of motive energy to the left and right front wheels 6 is cut off and a front-wheel driven condition wherein the left and right front wheels 6 are driven is selected. Furthermore, when the transmission selection device 16 switches only the constant velocity clutch 32 to an On condition via hydraulic control, a front-wheel drive condition wherein the left and right front wheels 6 drive at a peripheral speed identical to that of the left and right rear wheels 7 is selected. Conversely, when the transmission selection device 16 switches only the acceleration clutch 33 to an On condition via hydraulic control, a front-wheel acceleration condition wherein the left and right front wheels 6 drive at a peripheral speed approximately twice that of the left and right rear wheels 7 is selected.

The operating-power speed change device 20 is configured as a hydraulic operation type device switching via hydraulic control to any one of a neutral condition wherein motive energy from the engine 4 is cut off, a first speed-change condition wherein the motive energy is speed changed to a forward-rotation motive energy at a first speed, being a lowest speed; a second speed-change condition wherein the motive energy is speed changed to a forward-rotation motive energy at a second speed; a third speed-change condition wherein the motive energy is speed changed to a forward-rotation motive energy at a third speed; a fourth speed-change condition wherein the motive energy is speed changed to a forward-rotation motive energy at a fourth speed, being a highest speed; and a reverse transmission condition wherein the motive energy is switched to a reverse-rotation motive energy. Furthermore, the operating-power speed change device 20 is operationally linked via a hydraulic control system with an operating-power speed change lever 36 provided in a foot space below the steering wheel 11 and capable of maintaining a position thereof in order that the hydraulic control of the operating-power speed change device 20 can be performed based on an operation of the operating-power speed change lever 36.

A multi-plate type side brake 37 is provided on each of the left and the right sides of the T/M case 8. The left and right side brakes 37 are linked via a brake cylinder 39 and a linkage rod 40, etc. to left and right brake pedals 38, respectively, provided in a right foot space of the on-board driving section 9. As a result of this linkage, when a brake pedal 38 is subjected to a by-foot depression operation, braking of the corresponding rear wheel 7 is performed with a braking force corresponding to the degree of by-foot depression of the brake pedal 38.

A single acting type hydraulic cylinder is employed as each of the left and right brake cylinders 39. Through expansion and contraction operations in response to hydraulic control, the left and right brake cylinders 39 switch the corresponding side brake 37 to either a non-braked or braked condition. That is to say, each of the left and right side brakes 37 is configured such that, even when a by-foot depression operation of the corresponding brake pedal 38 is not being carried out, a contraction operation of the corresponding brake cylinder 39 in response to hydraulic control results in braking of the corresponding rear wheel 7 at a braking force corresponding to the degree of contraction operation thereof.

A pair of left and right lifting arms 41 is provided at an upper section of a rear end of the T/M case 8 so as to be capable of swinging vertically. A pair of left and right elevation cylinders 42 driving the corresponding lifter arms 41 so as to swing vertically is provided behind the T/M case 8. A single acting type hydraulic cylinder is employed as each of the left and right elevation cylinders 42. The left and right elevation cylinders 42 drive the left and right lifter arms 42 to swing in a vertical direction through expansion and contraction operations in response to hydraulic control. That is to say, the rotary tiling device 3 moves vertically due to expansion and contraction operations of the left and right elevation cylinders 42 in response to hydraulic control.

The link mechanism 2 is configured as a three-point link mechanism comprising an upper link 43 connected to an upper section of a rear end of the T/M case 8 so as to be capable of swinging in a vertical direction and a pair of left and right lower links 44 connected to an lower section of a rear end of the T/M case 8 so as to be capable of swinging in a vertical direction. A linkage rod 45 connects a central section of the left side lower link 44 in a fore-and-aft direction and the left side lifter arm 41, interlocking the left side lower link 44 and the left side lifter arm 41. A rolling cylinder 46 connects a central section of the right side lower link 44 in a fore-and-aft direction and the right side lifter arm 41, interlocking the right side lower link 44 and the right side lifter arm 41. A reciprocating-type hydraulic cylinder is employed as the rolling cylinder 46. The rolling cylinder 46 drives the right side lower link 44 so as to swing in a vertical direction through expansion and contraction operations in response to hydraulic control. That is to say, the rotary tilling device 3 performs rolling due to expansion and contraction operations of the rolling cylinder 46 in response to hydraulic control.

Figure 5:
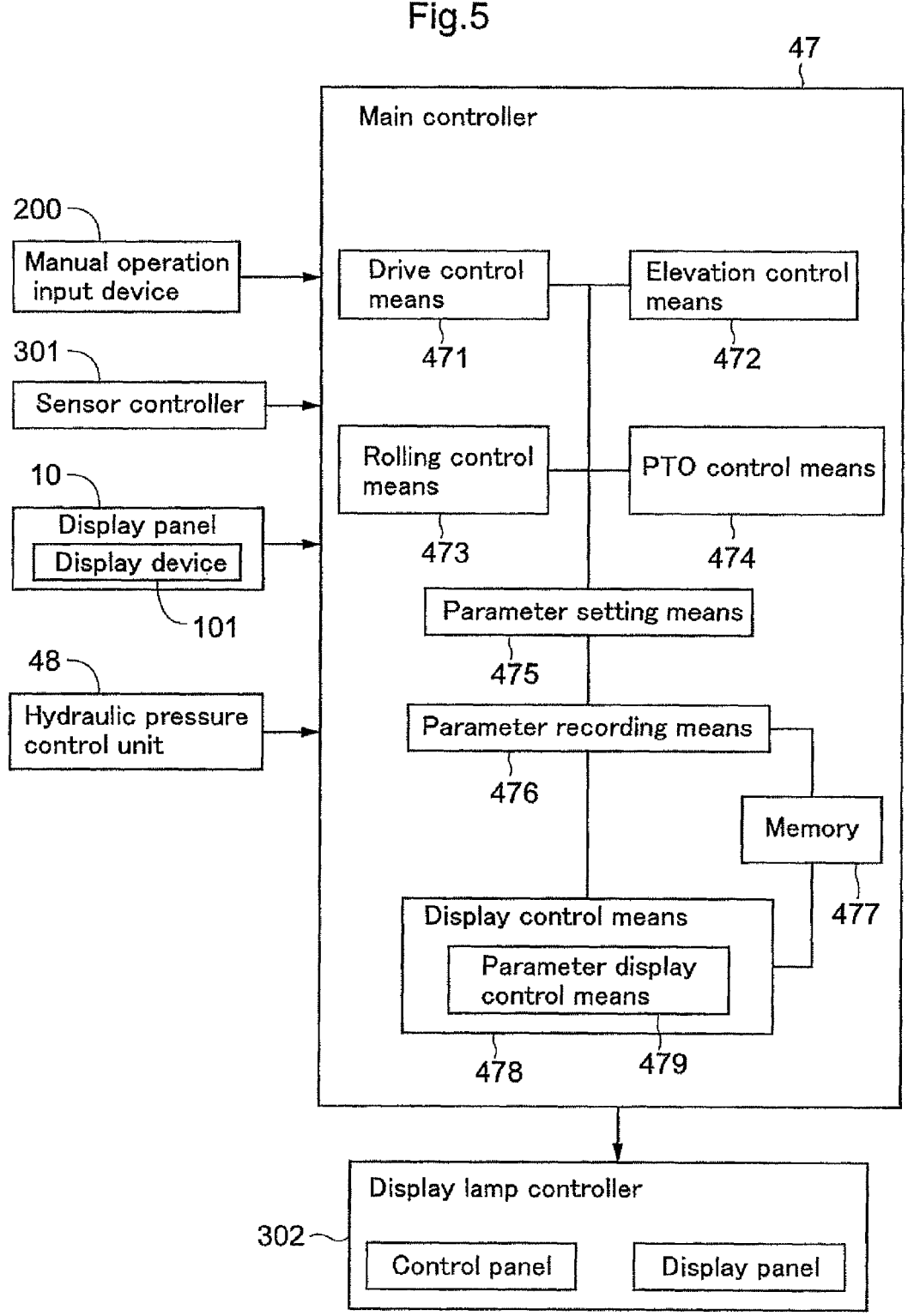
FIG. 5 is a control block diagram of a display system according to the present invention.

As shown in FIG. 5, the tractor 1 is provided with a main controller 47 comprising a micro-computer, a hydraulic pressure control unit 48 adjusting hydraulic pressure based on control commands from the main controller 47, a display lamp controller 302 controlling display lamps of various types based on control commands from the main controller 47, and a sensor controller 301 relaying signals from various sensors as constituent elements of an electronic control system. Furthermore, the main controller 47 is connected to the display panel 10 and to various switches and setting devices commonly referred to as a manual operation input device 200. The display panel 10 includes a liquid crystal display 101 as a display device displaying various types of information.

The main controller 47 is provided with a drive control means 471 controlling driving of the tractor 1, an elevation control means 472 controlling elevation of the rotary tilling device 3, a rolling control means 473 controlling rolling of the rotary tilling device 3, and a PTO control means 474 controlling operation of the rotary tilling device 3 as a control program. Furthermore, the main controller 47 is provided with a parameter setting means 475 setting an appropriate group of operation parameters for the tractor 1 (as a typical working vehicle) and the rotary tilling device 3 (as a typical working implement) for each state of an operation performed through combination of the working implement and the working vehicle, a parameter recording means 476 storing the group of operation parameters set by the parameter setting means 475 in a memory 477 based on input operations performed via the operation input device 200, and a parameter display control means 479 displaying the group of operation parameters stored in the memory 477 on the liquid crystal display 101 in response to input operations performed via the operation input device 200 as constituent elements of the operation parameter display system according to the present invention.

Figure 6:
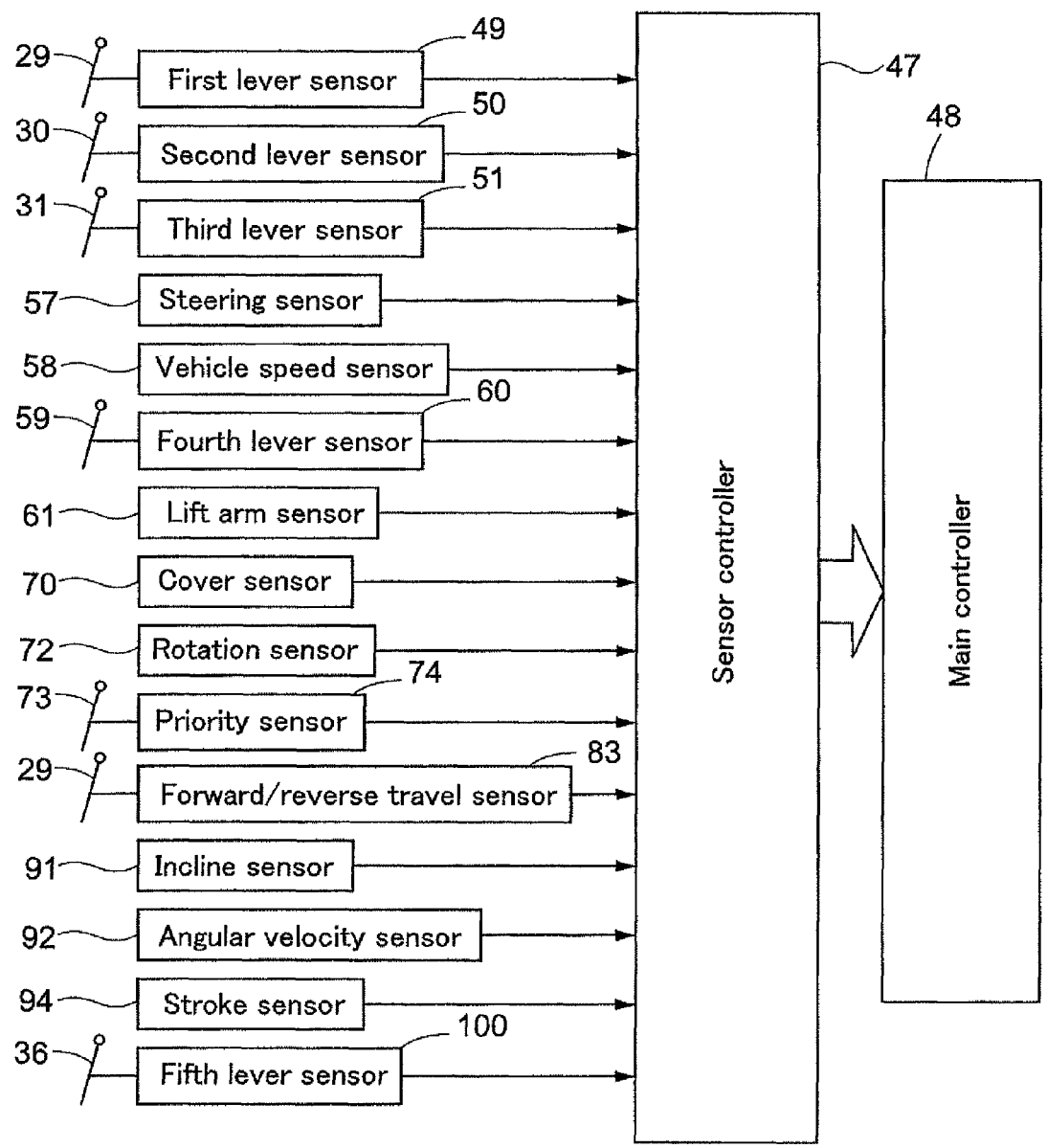
FIG. 6 is a control block diagram of peripheral devices of the display system.
Figure 7:
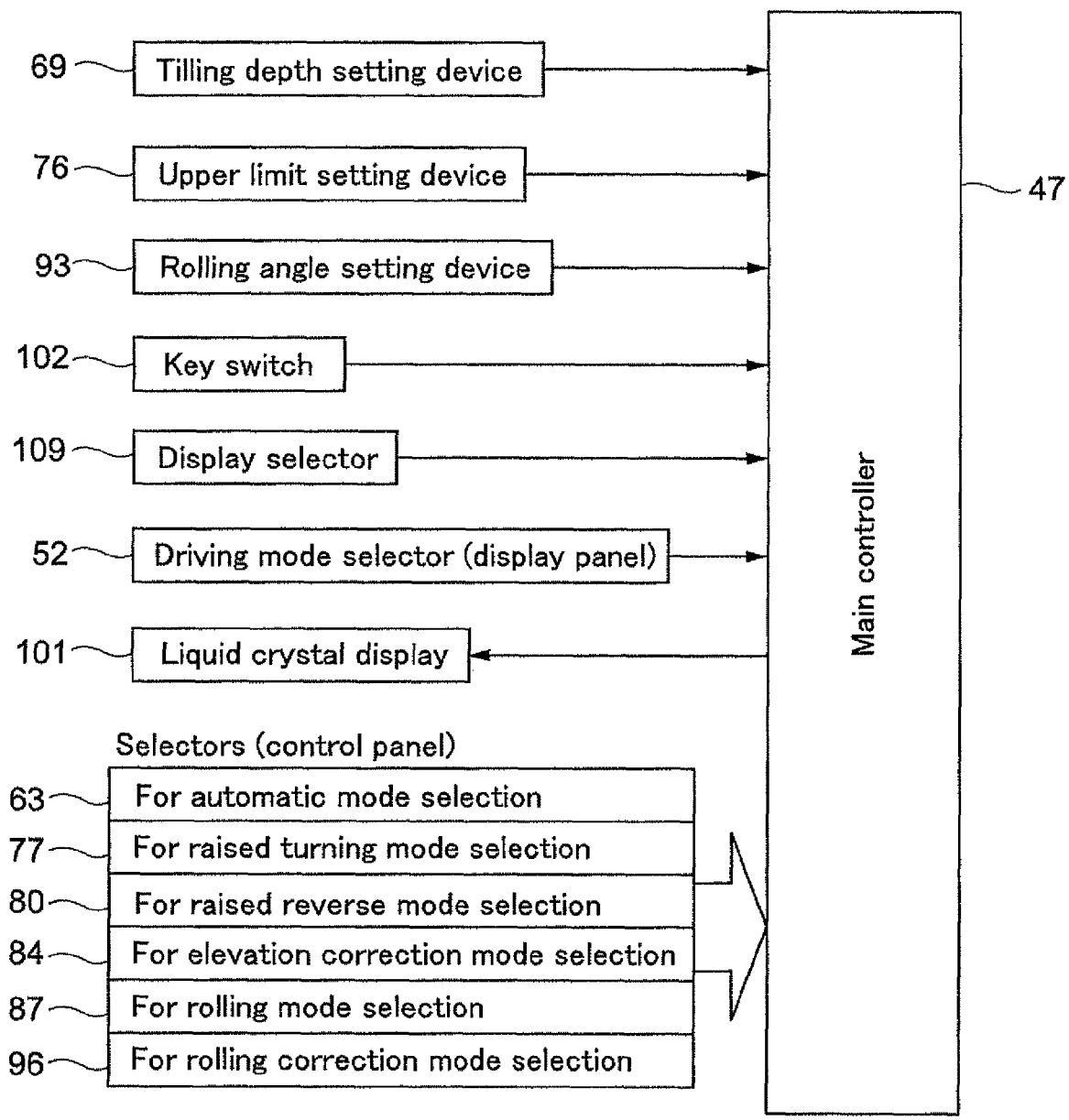
FIG. 7 is a control block diagram of peripheral devices of the display system.
Figure 8:
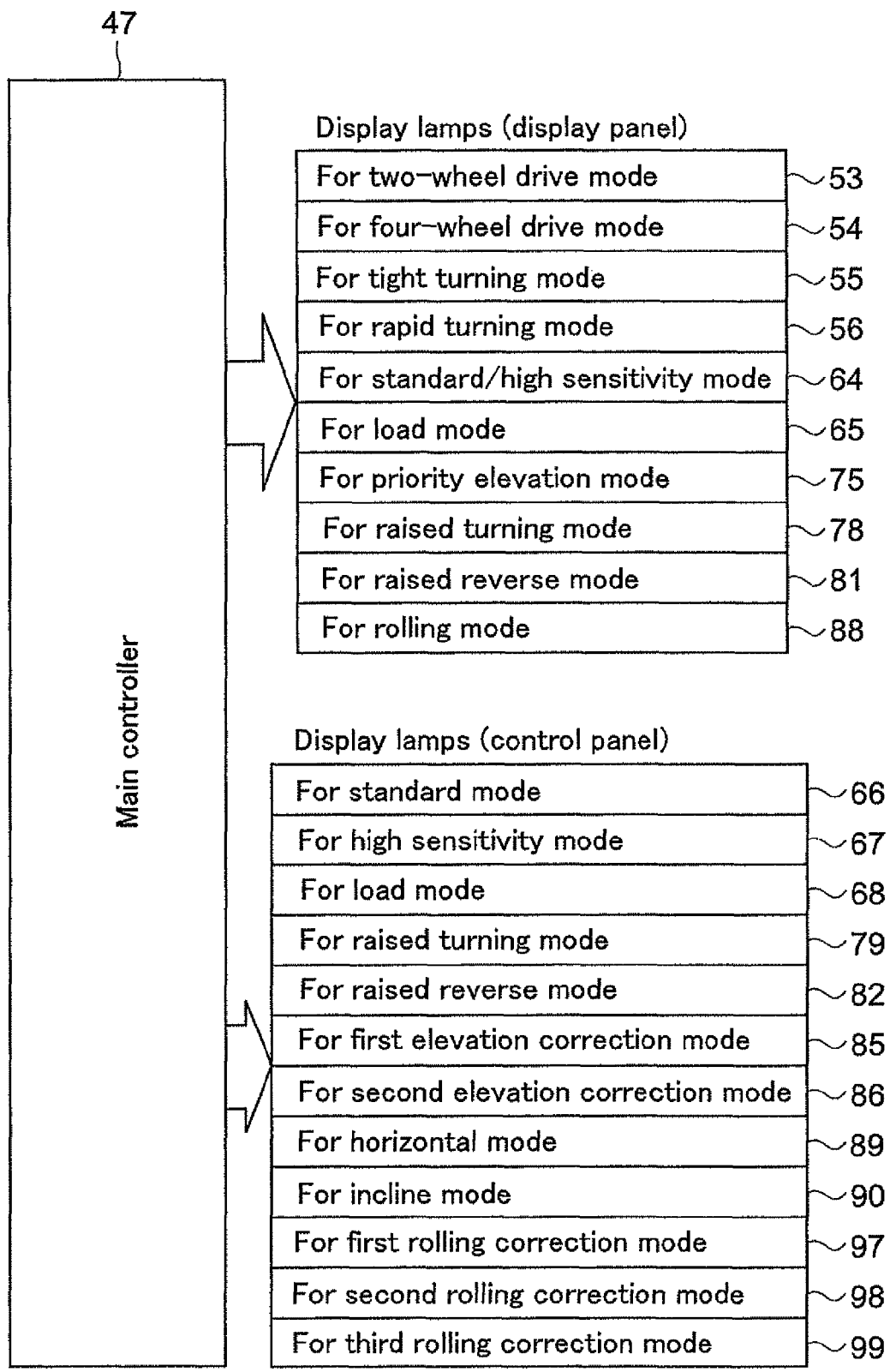
FIG. 8 is a control block diagram of peripheral devices of the display system.
Figure 9:
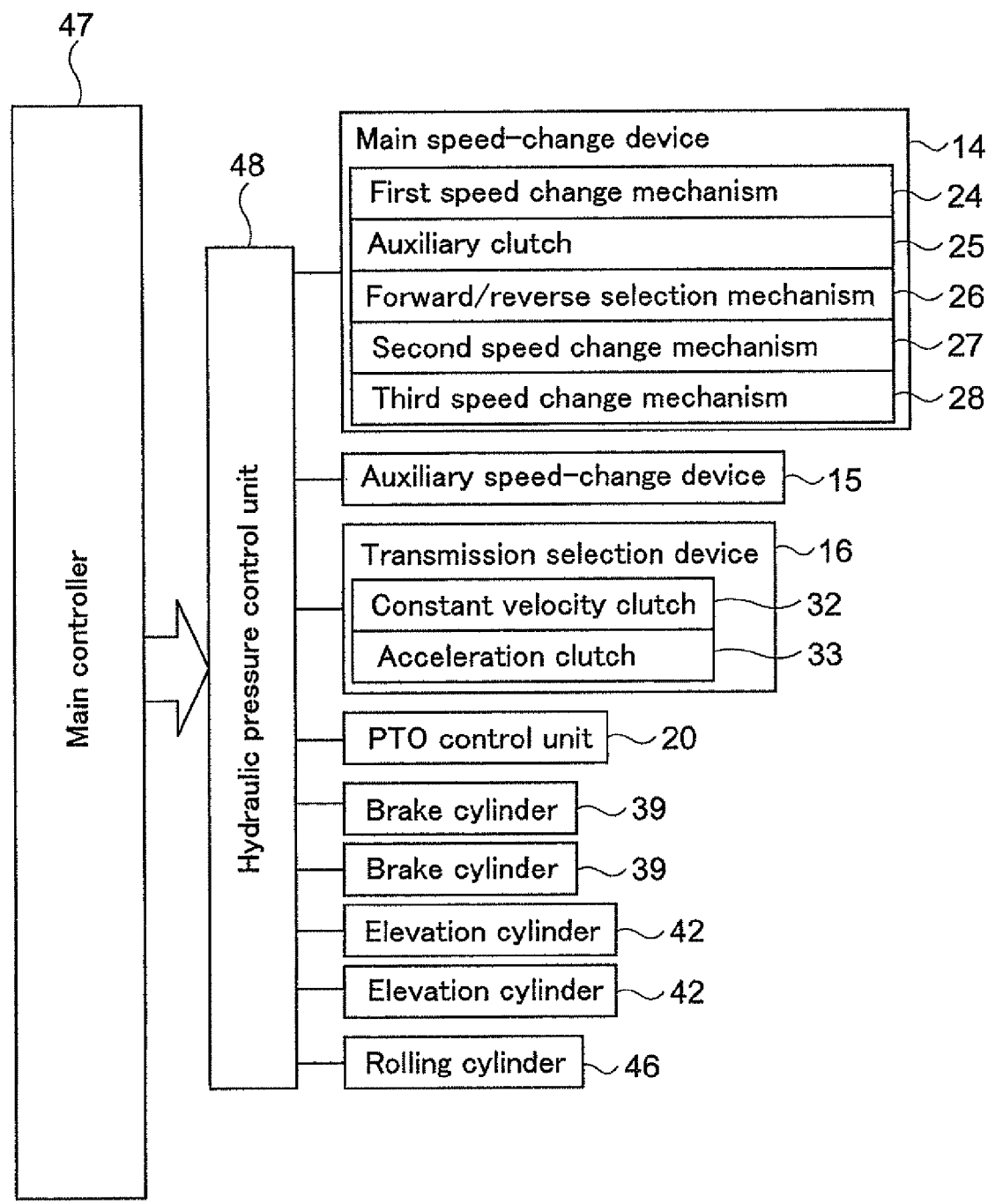
FIG. 9 is a control block diagram of peripheral devices of the display system.
Figure 10:
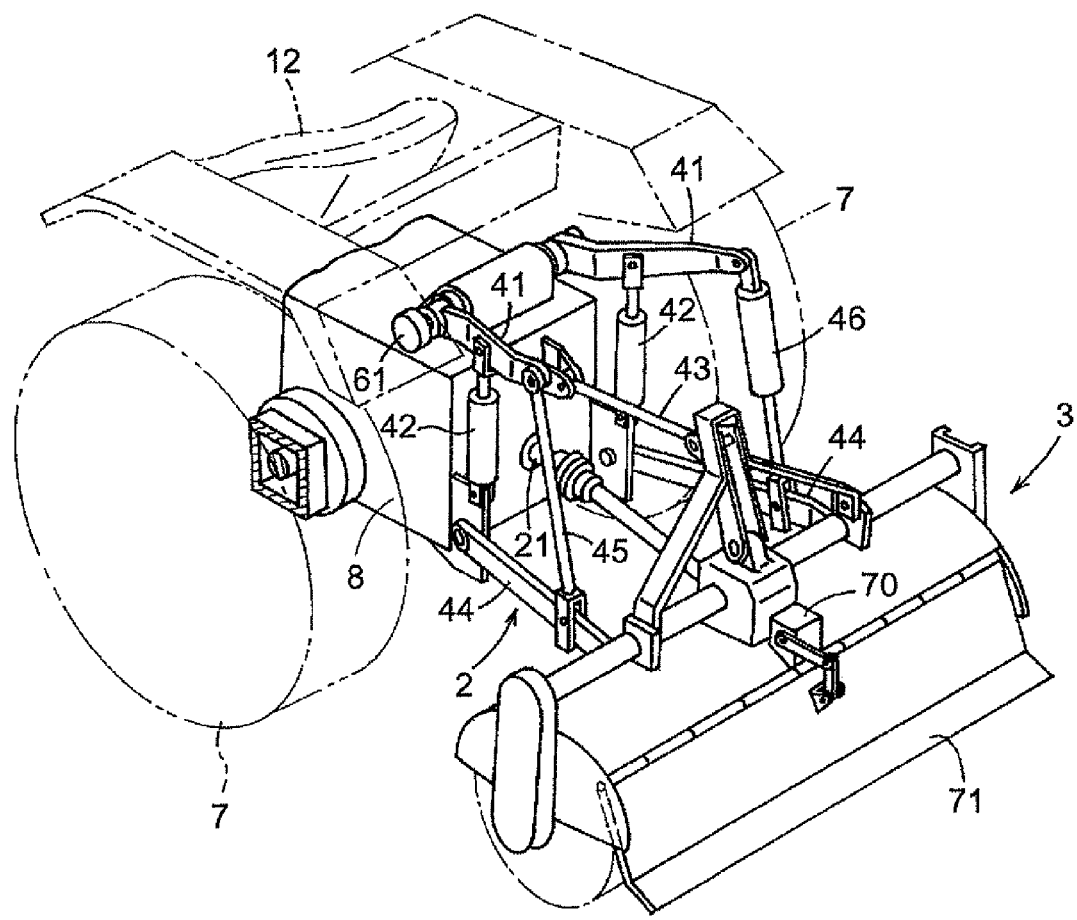
FIG. 10 is a perspective view of a main section showing a vertical-motion operation construction and a rolling operation construction of a rotary tiller device.

FIG. 6 shows various sensors connected to the main controller 47 via the sensor controller 301. FIG. 7 shows switches and setting devices connected to the main controller 47. FIG. 8 shows display lamps subjected to flashing control by the main controller 47 and disposed on the display panel and the control panel. FIG. 9 shows a hydraulic operation device subjected to hydraulic-pressure control via the hydraulic pressure control unit 48. FIG. 10 shows an elevation mechanism of the rotary tilling device 3.

The hydraulic pressure control unit 48 comprises a control valve and other hydraulic devices for driving in order to facilitate hydraulic control related to driving of the tractor 1, a control valve and other hydraulic devices for elevation in order to facilitate hydraulic control related to elevation of the rotary tilling device 3, a control valve and other hydraulic devices for rolling in order to facilitate hydraulic control related to rolling of the rotary tilling device 3, and a control valve and other hydraulic devices for operation in order to facilitate hydraulic control related to operation of the rotary tilling device 3, etc.

The drive control means 471 controls the hydraulic pressure control unit 48 based on detection by a first lever sensor 49 detecting an operation position of the forward/reverse selection lever 29, detection by a second lever sensor 50 detecting an operation position of the main speed change lever 30, and detection by a third lever sensor 51 detecting an operation position of the auxiliary speed change lever 31. The hydraulic pressure control unit 48 operates the main speed-change device 14 and the auxiliary speed-change device 15 based on control commands from the drive control means 471 so as to produce a speed change condition corresponding to the operation position of the forward/reverse selection lever 29, the operation position of the main speed change lever 30, and the operation position of the auxiliary speed change lever 31. The tractor 1 has 30 forward travel speed-change stages and 20 reverse travel speed-change stages.

It should be noted that a rotary-type potentiometer detecting a swing operation of the corresponding lever 29, 30, 31 or one switch, a plurality of switches, or a multiple-contact switch, etc. detecting arrival of the corresponding lever 29, 30, 31 at a prescribed operation position or a plurality of operation positions is employed as each of the lever sensors 49, 50, 51.

The drive control means 471 can, as driving control modes, produce a two-wheel drive mode wherein transfer of motive energy to the left and right front wheels 6 is cutoff and only the left and right rear wheels 7 are driven; a four-wheel drive mode wherein motive energy is also transferred to the left and right front wheels 6 and the left and right front wheels 6 and the left and right rear wheels 7 are driven; a tight turning mode wherein the left and right front wheels 6 and the left and right rear wheels 7 are driven, and in addition, the left and right front wheels 6 are driven to accelerate in an interlocked manner with a steering operation of a preset angle or greater; and a rapid turning mode wherein the left and right front wheels 6 and the left and right rear wheels 7 are driven, and in addition, the left and right front wheels 6 are driven to accelerate and the rear wheel 7 on the inner side of the turn is subjected to braking in an interlocked manner with a steering operation of a preset angle or greater.

Figure 11:
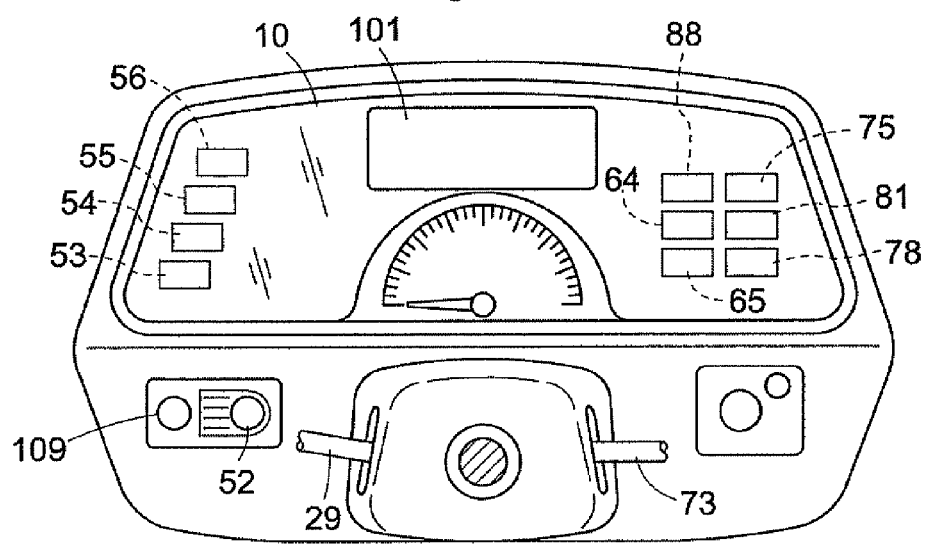
FIG. 11 is a plan view of a display panel.

Upon each short pressing operation of a selector 52 for selecting a driving mode and provided below and to the left of the display panel 10 as shown in FIG. 11, the drive control means 471 sequentially switches the driving control mode to be used, and from four display lamps 53, 54, 55, 56 disposed in a vertical line at a left end section of the display panel 10, turns on the display lamp corresponding to the driving mode selected for use.

In a case wherein usage of the two-wheel drive mode is selected, the hydraulic pressure control unit 48 is controlled such that the transmission selection device 16 selects the above-explained front-wheel driven condition. As a result thereof, a two-wheel drive condition wherein only the left and right rear wheels 7 are driven is produced.

In a case wherein usage of the four-wheel drive mode is selected, the hydraulic pressure control unit 48 is controlled such that the transmission selection device 16 selects the above-explained front-wheel drive condition. As a result thereof, a four-wheel drive condition wherein the left and right front wheels 6 and the left and right rear wheels 7 are driven with the same peripheral speed is produced.

In a case wherein usage of the tight turning mode has been selected, it is determined, based on a detection value of a steering sensor 57 detecting an angle of a swing operation of a Pitman arm (not shown) to the left or right thereof as a steering angle of the front wheels 6, whether or not a steering operation of a preset angle or greater from a straight-ahead condition (for example, a steering operation wherein the steering angle of the front wheels 6 is 30° or greater) is being performed. If the steering operation is less than the preset angle, the hydraulic pressure control unit 48 is controlled so as to achieve the above-explained four-wheel drive condition. If the steering operation is equal to or greater than the preset angle, it is determined, based on a detection value of a vehicle speed sensor 58 detecting an output speed of the main speed-change device 14 as the vehicle speed, whether or not the vehicle speed is within a preset operation speed range (for example, 0.2 to 5.0 km/h). If the vehicle speed is not within the preset operation speed range, the hydraulic pressure control unit 48 is controlled so as to achieve the above-explained four-wheel drive condition. If the vehicle speed is within the preset operation speed range, the hydraulic pressure control unit 48 is controlled such that the transmission selection device 16 selects the above-explained front-wheel acceleration condition. If the transmission selection device 16 switches to the front-wheel acceleration condition, the left and right front wheels 6 are driven at approximately twice the peripheral speed of the left and right rear wheels 7, and as a result thereof, the chassis is capable of turning with a smaller turning radius than that of the four-wheel drive condition. That is to say, in the tight turning mode, by performing a steering operation of a preset angle or greater from a straight-ahead condition in a condition wherein the vehicle speed is within a preset operation speed range, a tight turning condition wherein the chassis is turned with a smaller turning radius than that of the four-wheel drive condition is realized.

In a case wherein usage of the rapid turning mode has been selected, it is determined, based on a detection value of the steering sensor 57, whether or not a steering operation of a preset angle or greater from a straight-ahead condition is being performed. If the steering operation is less than the preset angle, the hydraulic pressure control unit 48 is controlled so as to achieve the above-explained four-wheel drive condition. If the steering operation is equal to or greater than the preset angle, it is determined, based on a detection value of a vehicle speed sensor 58, whether or not the vehicle speed is within a preset operation speed range. If the vehicle speed is not within the preset operation speed range, the hydraulic pressure control unit 48 is controlled so as to achieve the above-explained four-wheel drive condition. If the vehicle speed is within the preset operation speed range, it is determined whether the vehicle speed is within a low speed range (for example, 0.2 to 3.5 km/h) or within a high speed range (for example, 3.6 to 5.0 km/h) of the operation speed range. If the vehicle speed is within the high speed range, the hydraulic pressure control unit 48 is controlled so as to achieve the above-explained tight turning condition. If the vehicle speed is within the low speed range, the hydraulic pressure control unit 48 is controlled such that the transmission selection device 16 switches to the above-explained front-wheel acceleration condition, and based on a detection value of a steering sensor 57, the hydraulic pressure control unit 48 is also controlled such that the side brake 37 on the inner side of the turn is switched to a braking condition. If the transmission selection device 16 switches to the front-wheel acceleration condition and the side brake 37 on the inner side of the turn switches to a braking condition, the left and right front wheels 6 are driven at approximately twice the peripheral speed of the left and right rear wheels 7, and in addition, the rear wheel 7 on the inner side of the turn is subjected to braking. As a result thereof, the chassis is capable of turning with an even smaller turning radius than that of the tight turning condition. That is to say, in the rapid turning mode, by performing a steering operation of a preset angle or greater from a straight-ahead condition in a condition wherein the vehicle speed is within the high speed range of the preset operation speed range, a tight turning condition wherein the chassis is turned with a smaller turning radius than that of the four-wheel drive condition is realized. Furthermore, by performing a steering operation of a preset angle or greater from a straight-ahead condition in a condition wherein the vehicle speed is within the low speed range of the preset operation speed range, a rapid turning condition wherein the chassis is turned with an even smaller turning radius than that of the tight turning condition is realized. It should be noted that a rotary potentiometer, etc. can be employed as the steering sensor 57, and an electromagnetic pickup type rotation sensor, etc. can be employed as the vehicle speed sensor 58.

As elevation control modes, the elevation control means 472 comprises a free elevation mode wherein the rotary tilling device 3 is moved vertically to any height position, a standard mode wherein the rotary tilling device 3 is maintained at a set tilling depth based on an actual tilling depth of the rotary tilling device 3 with a standard control sensitivity, a high sensitivity mode wherein the rotary tilling device 3 is maintained at a set tilling depth based on an actual tilling depth of the rotary tilling device 3 with a high level of control sensitivity, a load mode wherein the rotary tilling device 3 is maintained at a set depth based on an engine load, a priority elevation mode having priority over the above-explained modes and wherein the rotary tilling device 3 is moved vertically to a preset upper limit position or a preset lower limit position, a raised turning mode wherein the rotary tilling device 3 is raised to a preset upper-limit position in an interlocked manner with a steering operation of a preset angle or greater, and a raised reverse mode wherein the rotary tilling device 3 is raised to a preset upper-limit position in an interlocked manner with selection of a reverse condition.

The elevation control means 472 activates the free elevation mode based on a swing operation of an elevation lever 59 provided to the right of the driving seat 12. In the free elevation mode, the hydraulic pressure control unit 48 is controlled based on a detection value of a fourth lever sensor 60 detecting an operation position of the elevation lever 59, a detection value of a lift arm sensor 61 detecting a vertical swing angle of the lift arms 41, and correlation data correlating these detection values such that the detection value of the lift arm sensor 61 corresponds to the detection value of the fourth lever sensor 60 (that is, enters a non-sensitive zone for the detection value of the fourth lever sensor 60). The correlation data correlates the detection value of the fourth lever sensor 60 as a target height position of the rotary tilling device 3 and the detection value of the lift arm sensor 61 as an actual height position of the rotary tilling device 3. That is to say, in the free elevation mode, as a result of an action of the elevation control means 472 based on a swing operation of the elevation lever 59, the rotary tilling device 3 is moved vertically to an arbitrary height position corresponding to the position of the elevation lever 59. It should be noted that a rotary-type potentiometer, etc. can be employed as each of the fourth lever sensor 60 and the lift arm sensor 61. Map data or a correlation equation, etc. can be employed as the above-explained correlation data.

Figure 12:
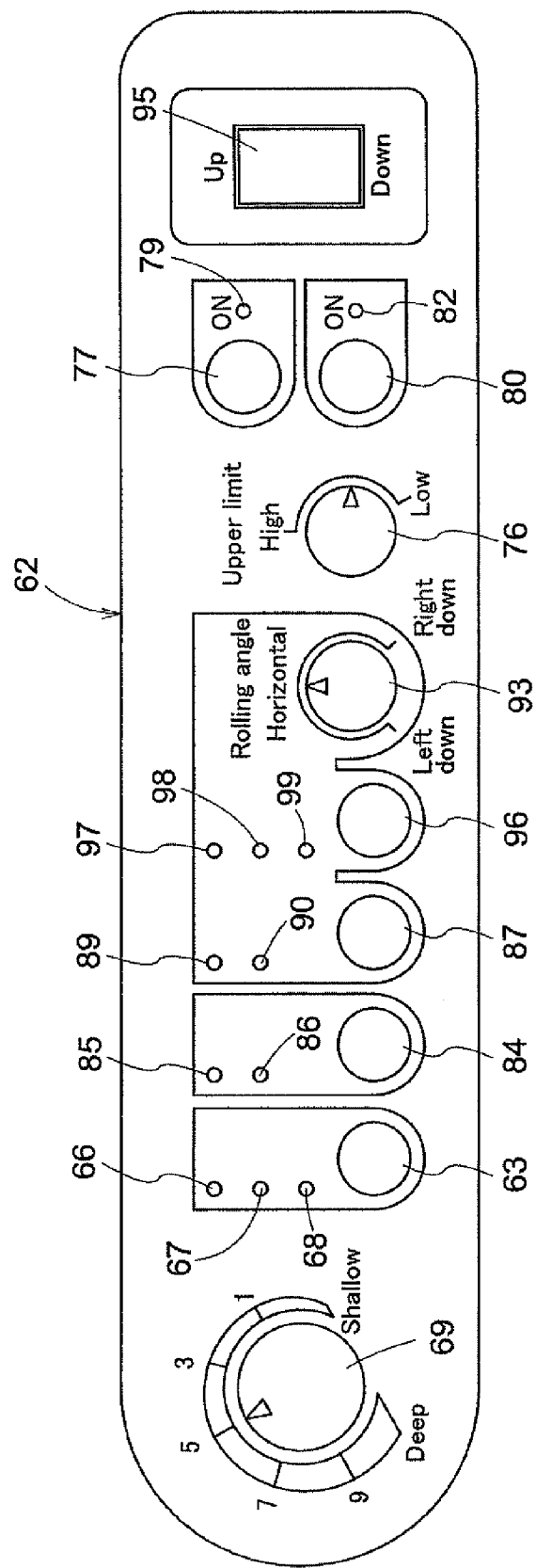
FIG. 12 is a plan view of a control panel.

A control panel 62 as shown in FIG. 12 is provided to the rear of the elevation lever 59. Upon each short pressing of a selector 63 provided on the control panel 62 for automatic mode selection, the elevation control means 472 sequentially switches the automatic mode to be used between the standard mode, the high sensitivity mode, and the load mode, and from two display lamps 64, 65 disposed on the display panel 10 and three display lamps 66, 67, 68 disposed on the control panel 62, turns on the lamp corresponding to the automatic mode selected for use. Furthermore, in a case wherein the elevation lever 59 is determined, based on the detection value of the fourth lever sensor 60, to have been swing operated to a floating zone provided in the vicinity of the lowest position of the swing operation range thereof, the previously selected automatic mode is activated with priority over the free elevation mode.

In a case wherein usage of the standard mode is selected, the hydraulic pressure control unit 48 is controlled based on an output value of a tilling depth setting device 69 provided on the control panel 62, a detection value of a cover sensor 70 provided on the rotary tilling device 3, and correlation data correlating these output and detection values such that the detection value of the cover sensor 70 corresponds to the output value of the tilling depth setting device 69 (that is, enters a non-sensitive zone for the output value of the tilling depth setting device 69) with a standard control sensitivity. The cover sensor 70 detects a vertical swing angle of a rear cover 71 swinging vertically pursuant to variations in a tilling depth of the rotary tilling device 3. The correlation data correlates the output value of the tilling depth setting device 69 as the set tilling depth of the rotary tilling device 3 and the detection value of the cover sensor 70 as the actual tilling depth of the rotary tilling device 3. That is to say, in the standard mode, as a result of control performed by the elevation control means 472 based on the actual tilling depth of the rotary tilling device 3 detected by the cover sensor 70, the rotary tilling device 3 is maintained with a standard level of control sensitivity at a set tilling depth set by the tilling depth setting device 69.

In a case wherein usage of the high sensitivity mode is selected, the hydraulic pressure control unit 48 is controlled based on an output value of the tilling depth setting device 69, a detection value of the cover sensor 70, and correlation data correlating these output and detection values such that the detection value of the cover sensor 70 corresponds to the output value of the tilling depth setting device 69 (that is, enters a non-sensitive zone for the output value of the tilling depth setting device 69) with a higher level of control sensitivity than the standard level of control sensitivity. That is to say, in the high sensitivity mode, as a result of control performed by the elevation control means 472 based on the actual tilling depth of the rotary tilling device 3 detected by the cover sensor 70, the rotary tilling device 3 is maintained with a higher level of control sensitivity than the standard level of control sensitivity at a set tilling depth set by the tilling depth setting device 69.

It should be noted that a rotary-type potentiometer is employed as the tilling depth setting device 69 and the cover sensor 70. Map data or a correlation equation, etc. can be employed as the correlation data. Modification of the control sensitivity is realized by changing the non-sensitive zone for the output value of the tilling depth setting device 69 or a control response speed, etc.

In a case wherein usage of the load mode is selected, the hydraulic pressure control unit 48 is, in principle, controlled based on the output value of the tilling depth setting device 69, the detection value of the lift arm sensor 61, and correlation data correlating these output and detection values such that the detection value of the lift arm sensor 61 corresponds to the output value of the tilling depth setting device 69 (that is, enters a non-sensitive zone for the output value of the tilling depth setting device 69). The correlation data correlates the output value of the tilling depth setting device 69 as the set tilling depth of the rotary tilling device 3 and the detection value of the lift arm sensor 61 as the actual height position of the rotary tilling device 3.

Subsequently a detection value of a rotation sensor 72 detecting the engine speed is monitored, and if the engine speed drops, it is determined that the engine load has increased as a result of the actual tilling depth of the rotary tilling device 3 increasing, and in line with that determination, the hydraulic pressure control unit 48 is controlled such that the actual height position of the rotary tilling device 3 becomes higher and the engine load decreases. When the engine speed is restored as a result of this elevation control, the hydraulic pressure control unit 48 is controlled such that the detection value of the lift arm sensor 61 corresponds to the output value of the tilling depth setting device 69 (that is, the actual height position of the rotary tilling device 3 returns to the set tilling depth). That is to say, in the load mode, the rotary tilling device 3 is maintained at the set tilling depth irrespective of the detection value of the cover sensor 70 as a result of the elevation control means 472 performing elevation control of the rotary tilling device 3 based on an output value of the rotation sensor 72 and with variations in the engine load pursuant to variations in the actual tilling depth taken into consideration. Consequently, by selecting usage of the load mode during a rotary tilling operation performed with the cover sensor 70 in a significantly raised condition, such as a paddy-field rough plowing operation, an inside-piling tilling operation, or a ridging operation, the rotary tilling operation can be performed in an appropriate manner with the actual tilling depth of the rotary tilling device 3 maintained at the set tilling depth.

It should be noted that an electromagnetic pickup type rotation sensor detecting an output speed of the engine 4 is employed as the rotation sensor 72. Map data or a correlation equation, etc. can be employed as the correlation data. The load mode can also be applied to tilling operations, etc. performed using plows not provided with a rear cover 71, etc.

The elevation control means 472 activates the priority elevation mode based on a swing operation of a neutral-return type priority lever 73 provided to the bottom right of the steering wheel 11. In this priority elevation mode, in a case wherein an upward swing operation of the priority lever 73 is identified based on a detection value of a priority sensor 74 detecting the swing operation of the priority lever 73, the hydraulic pressure control unit 48 is controlled such that a display lamp 75 provided on the display panel 10 and corresponding to the priority elevation mode is turned on, and based on an output value of an upper limit setting device 76 provided on the control panel 62, the detection value of the lift arm sensor 61, and correlation data correlating these output and detection values, the detection value of the lift arm sensor 61 corresponds to the output value of the upper limit setting device 76 (that is, enters a non-sensitive zone for the output value of the upper limit setting device 76). The correlation data correlates the output value of the upper limit setting device 76 as a setting upper-limit position of the rotary tilling device 3 and the detection value of the lift arm sensor 61 as the actual height position of the rotary tilling device 3.

Conversely, in a case wherein a downward swing operation of the priority lever 73 is identified, the display lamp 75 is turned off and an operation position of the elevation lever 59 is determined based on a detection value of the fourth lever sensor 60. In a case wherein the elevation lever 59 is outside the above-explained floating zone, the hydraulic pressure control unit 48 is controlled based on the detection value of the fourth lever sensor 60, the detection value of the lift arm sensor 61, and correlation data correlating these detection values such that the detection value of the lift arm sensor 61 corresponds to the detection value of the fourth lever sensor 60 (that is, enters a non-sensitive zone for the detection value of the fourth lever sensor 60). In a case wherein the elevation lever 59 is inside the above-explained floating zone, the automatic mode selected for use is determined, and if the automatic mode selected for use is the standard mode or the high sensitivity mode, the hydraulic pressure control unit 48 is controlled based on the output value of the tilling depth setting device 69, the detection value of the cover sensor 70, and correlation data correlating these output and detection values such that the detection value of the cover sensor 70 corresponds to the output value of the tilling depth setting device 69 (that is, enters a non-sensitive zone for the output value of the tilling depth setting device 69). In a case wherein the load mode is the automatic mode selected for usage, the hydraulic pressure control unit 48 is, in principle, controlled based on the output value of the tilling depth setting device 69, the detection value of the lift arm sensor 61, and correlation data correlating these output and detection values such that the detection value of the lift arm sensor 61 corresponds to the output value of the tilling depth setting device 69 (that is, enters a non-sensitive zone for the output value of the tilling depth setting device 69). That is to say, when an upward swing operation of the priority lever 73 is performed, the rotary tilling device 3 can be automatically raised to an upper limit position set in advance by the upper limit setting device 76 through a control operation of the elevation control means 472 based on the detection value of the priority sensor 74. Conversely, when a downward swing operation of the priority lever 73 is performed, the rotary tilling device 3 can be automatically lowered to an arbitrary height position set in advance by the elevation lever 59 (as a typical lower-limit position) or a set tilling depth set by the tilling depth setting device 69 (as a typical lower-limit position) through a control operation of the elevation control means 472 based on the detection value of the priority sensor 74.

It should be noted that a sensor comprising a switch provided with a first contact closed in an interlocked manner with an upward swing operation of the priority lever 73 and a second contact closed in an interlocked manner with a downward swing operation of the priority lever 73 or a sensor comprising a first switch closed in an interlocked manner with an upward swing operation of the priority lever 73 and a second switch closed in an interlocked manner with a downward swing operation of the priority lever 73 can be employed as the priority sensor 74. A rotary-type potentiometer is employed as the upper limit setting device 76. Map data or a correlation equation, etc. can be employed as the above-explained correlation data.

Upon each short pressing operation of a selector 77 for selecting the raised turning mode and provided on the control panel 62, the elevation control means 472 switches between a selection condition selecting usage of the raised turning mode and a selection cancellation condition canceling that selection. At that time, a display lamp 78 corresponding to the raised turning mode and provided on the display panel 10 and a display lamp 79 corresponding to the raised turning mode and provided on the control panel 62 are turned on pursuant the above-explained selection and turned off pursuant to the above-explained selection cancellation.

When travel of the chassis is identified based on the detection value of the vehicle speed sensor 58 and ground contact of the rotary tilling device 3 is identified based on the detection value of the fourth lever sensor 60 (that is, operation of the elevation lever 59 to the floating zone thereof, the tractor 1 is deemed to be in a traveling operation condition. In a case wherein usage of the raised turning mode is selected, if a steering operation of a preset angle or greater from a straight-ahead condition (for example, a steering operation wherein the steering angle of the front wheels 6 is 30° or greater) is identified based on the detection value of the steering sensor 57 in such a traveling operation condition, the hydraulic pressure control unit 48 is controlled based on the output value of the upper limit setting device 76, the detection value of the lift arm sensor 61, and correlation data correlating these output and detection values such that the detection value of the lift arm sensor 61 corresponds to the output value of the upper limit setting device 76 (that is, enters a non-sensitive zone for the output value of the upper limit setting device 76). That is to say, as a result of selecting usage of the raised turning mode, upon ridge line turning wherein a steering operation of a preset angle or greater from a straight-ahead condition is performed in the traveling operation condition, the rotary tilling device 3 moves automatically to the upper limit position set by the upper limit setting device 76 in an interlocked manner with the steering operation at that time as a result of a control operation of the elevation control means 472 based on the detection value of the steering sensor 57.

Upon each short pressing operation of a selector 80 for selecting the raised reverse mode and provided on the control panel 62, the elevation control means 472 switches between a selection condition selecting usage of the raised reverse mode and a selection cancellation condition canceling that selection. At that time, a display lamp 81 corresponding to the raised reverse mode and provided on the display panel 10 and a display lamp 82 corresponding to the raised reverse mode and provided on the control panel 62 are turned on pursuant the above-explained selection and turned off pursuant to the above-explained selection cancellation.

In a case wherein usage of the raised reverse mode is selected, if switching from a forward travel condition to a reverse travel condition due to operation of the forward/reverse selection lever 29 is identified in the above-explained traveling operation condition based on a detection value of a forward/reverse travel sensor 83 detecting a transfer condition of the forward/reverse selection mechanism 26, the hydraulic pressure control unit 48 is controlled based on the output value of the upper limit setting device 76, the detection value of the lift arm sensor 61, and correlation data correlating these output and detection values such that the detection value of the lift arm sensor 61 corresponds to the output value of the upper limit setting device 76 (that is, enters a non-sensitive zone for the output value of the upper limit setting device 76). That is to say, as a result of selecting usage of the raised reverse mode, when the forward travel condition switches to the reverse travel condition in the traveling operation condition, the rotary tilling device 3 moves automatically to the upper limit position set by the upper limit setting device 76 in an interlocked manner with the switching operation due to an operation of the elevation control means 472 based on the detection value of the forward/reverse travel sensor 83.

Incidentally, a first switch turned on pursuant to a swing operation of the forward/reverse selection lever 29 to a forward travel position and a second switch turned on pursuant to a swing operation of the forward/reverse selection lever 29 to a reverse travel position are employed as the forward/reverse travel sensor 83.

As control modes for correction, the elevation control means 472 is provided with a first correction mode correcting correspondence relationships of values within groups of correlation data changing in accordance with the link mechanism 2 used so as to be suitable in a case wherein a link mechanism 2 of a standard specification is used and a second correction mode correcting the correspondence relationships so as to be suitable in a case wherein a link mechanism 2 of a special specification is used. Upon each short pressing operation of a selector 84 provided on the control panel 62 for selection of an elevation correction mode, the elevation control means 472 sequentially switches the correction mode to be used, and from two display lamps 85, 86 provided on the control panel 62, turns on the display lamp corresponding to the selected correction mode. That is to say, as a result of selection of a correction mode corresponding to the specification of the link mechanism 2 being used, the elevation control means 472 performs favorable elevation control appropriate for the specification of the link mechanism 2.

As control modes for rolling, the rolling control means 473 is provided with a horizontal mode wherein a rolling angle of the rotary tilling device 3 in a horizontal field is maintained at a set angle set in advance, an incline mode wherein a rolling angle of the rotary tilling device 3 during a traveling operation along contours in a sloping field is maintained at a set angle set in advance, and a priority mode wherein rolling of the rotary tilling device 3 is executed with priority over the horizontal mode and incline mode.

Upon each short pressing operation of a selector 87 provided on the control panel 62 for rolling mode selection, the rolling control means 473 sequentially switches the used control mode for rolling between the horizontal mode and the incline mode. At the same time, a display lamp 88 provided on the display panel 10 is turned on, and from two display lamps 89, 90 provided on the control panel 62, the display lamp corresponding to the control mode selected for use is turned on.

Furthermore, in a case wherein the horizontal mode is selected for use, the actual rolling angle of the tractor 1 is calculated based on a detection value of an incline sensor 91 detecting a rolling angle of the tractor 1 and a detection value of an angular velocity sensor 92 detecting a rolling angular velocity of the tractor 1, and a target length of the rolling cylinder 46 is set based on that calculated value, an output value of a rolling angle setting device 93 provided on the control panel 62, and correlation data correlating the length of the rolling cylinder 46 and the rolling angle of the rotary tilling device 3 with respect to the tractor 1. The hydraulic pressure control unit 48 is controlled based on this setting value and a detection value of a stroke sensor 94 detecting the length of the rolling cylinder 46 in order that. the detection value of the stroke sensor 94 matches the set value (that is, enters a non-sensitive zone for the set value). As a result thereof, the rotary tilling device 3 is maintained at a target rolling angle set by the rolling angle setting device 93.

It should be noted that a suspended-weight type sensor is employed as the incline sensor 91. A vibration gyro type sensor is employed as the angular velocity sensor 92. A rotary-type potentiometer is employed as the rolling angle setting device 93. A sliding-type potentiometer is employed as the stroke sensor 94. Map data or a correlation equation, etc. can be employed as the correlation data.

In a case wherein the incline mode is selected for use, although control is, in principle, performed in the same way as in a case wherein the horizontal mode is selected for use, the output value of the rolling angle setting device 93 (that is, the target rolling angle of the rotary tilling device 3) is automatically corrected with sinking of a furrow-side wheel taken into consideration. As a result thereof, the rotary tilling device 3 is accurately maintained at a target rolling angle set by the rolling angle setting device 93, regardless of sinking of a furrow-side wheel in a sloping field.

The rolling control means 473 activates the priority mode based on a swing operation of a neutral-return type priority switch 95 provided on the control panel 62. In the priority mode, in a case wherein the priority switch 95 is swing operated to the right, the hydraulic pressure control unit 48 is controlled such that the rolling cylinder 46 performs an extension operation with priority over the horizontal mode and the incline mode while the priority switch 95 is being swing operated to the right. Consequently, the rotary tilling device 3 performs free rolling with the left side thereof raised. Conversely, in a case wherein the priority switch 95 is swing operated to the left, the hydraulic pressure control unit 48 is controlled such that the rolling cylinder 46 performs a contraction operation with priority over the horizontal mode and the incline mode while the priority switch 95 is being swing operated to the left. Consequently, the rotary tilling device 3 performs free rolling with the left side thereof lowered. When the swing operation of the priority switch 95 is canceled and the priority switch 95 returns to the neutral position thereof, the hydraulic pressure control unit 48 is controlled such that the rotary tilling device 3 returns to the set angle set by the rolling angle setting device 93.

As control modes for correcting the correlation relationship between the rolling angle of the rotary tilling device 3 and the length of the rolling cylinder 46 with respect to the tractor 1 within correlation data changing in accordance with the rotary tilling device 3 being used, the rolling control means 473 is provided with a first correction mode wherein correction is carried out such that the correlation is appropriate for a case wherein a rotary tilling device 3 of a first specification is used, a second correction mode wherein correction is carried out such that the correlation is appropriate for a case wherein a rotary tilling device 3 of a second specification is used, and a third correction mode wherein correction is carried out such that the correlation is appropriate for a case wherein a rotary tilling device 3 of a third specification is used.

Upon each short pressing operation of a selector 96 provided on the control panel 62 for selection of a rolling correction mode, the rolling control means 473 sequentially switches the correction mode to be used. At that time, from three display lamps 97, 98, 99 provided on the control panel 62, the rolling control means 473 turns on the display lamp corresponding to the correction mode selected for use. That is to say, by selecting a correction mode corresponding to the specification of the rotary tilling device 3 to be used, the rolling control means 473 performs rolling control appropriate for the specification of the rotary tilling device 3.

A PTO control means 474 performs control of the hydraulic pressure control unit 48 based on a detection value of a fifth lever sensor 100 detecting an operating position of the operating-power speed change lever 36. Based on control commands from the PTO control means 474, the hydraulic pressure control unit 48 performs control of the operating-power speed change device 20 so as to realize a speed change condition corresponding to the operation position of the operating-power speed change lever 36. A pair of rotary-type potentiometers detecting a swing operation of the operating-power speed change lever 36 in two axial directions thereof or a plurality of switches or a multiple-contact switch detecting arrival of the operating-power speed change lever 36 at operating positions can be employed as the fifth lever sensor 100.

As can be seen from FIG. 11 and FIGS. 13A to 13E, the display panel 10 has a liquid crystal display 101 providing a text display of the current time and vehicle speed, etc. As a control program, the main controller 47 is provided with a display control means 478 controlling an operation of the liquid crystal display 101. In particular, the display control means 478 comprises a parameter display control means 479 for displaying operation parameters. Furthermore, the main controller 47 is also provided with a memory 477 comprising a non-volatile memory such as an EEPROM or flash memory, etc.

Figure 13A:
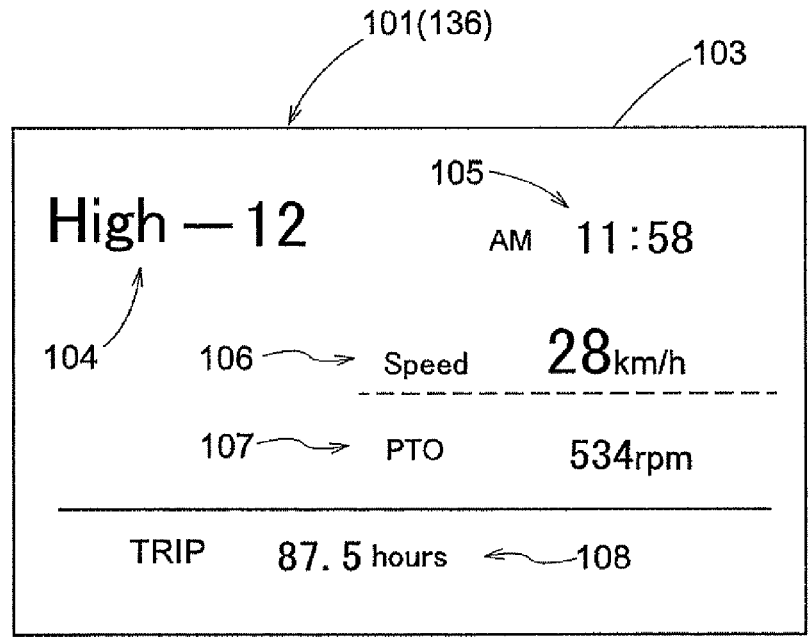
FIG. 13A is a screen view for explaining a display content of a liquid crystal display.

Upon the introduction of power as a result of an operation of a key switch 102 provided in the on-board driving section 9, the parameter display control means 479 displays a standard screen 103 (see FIG. 13A) on the liquid crystal display 101. As shown in FIG. 13A, the standard screen 103 comprises a first display area 104 displaying a speed-change stage of the main speed-change device 14 and a speed-change stage of the auxiliary speed-change device 15, a second display area 105 displaying the current time, a third display area 106 displaying the vehicle speed, a fourth display area 107 displaying a rotation speed of the operating-power take-off shaft 21, and a fifth display area 108 displaying an hour meter and a trip meter, etc. in a switchable manner.

Figure 13B:
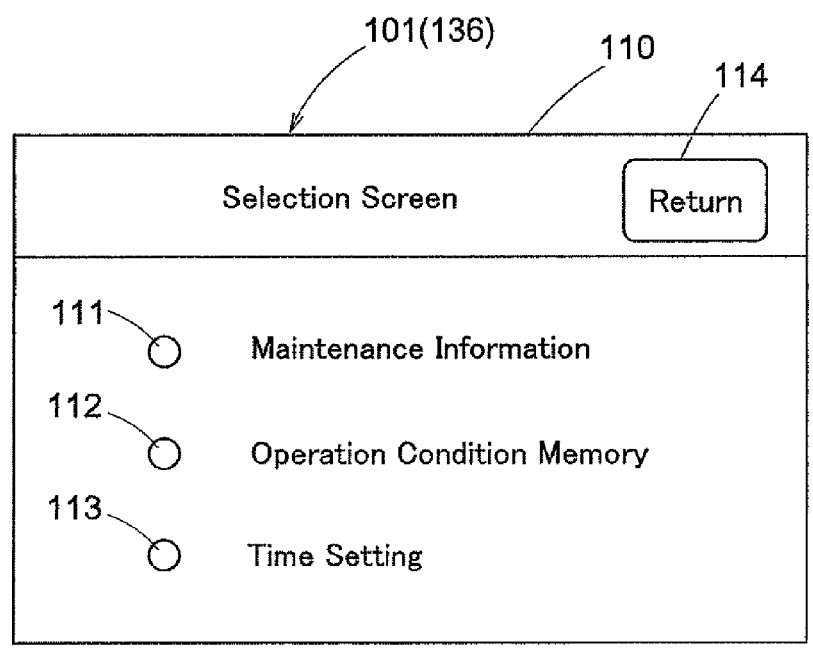
FIG. 13B is a screen view for explaining a display content of a liquid crystal display.

In a condition wherein the standard screen 103 is displayed, upon each short pressing operation of a display selector 109 provided in the vicinity of the selector 52 for selecting a driving mode, the parameter display control means 479 sequentially switches the display content of the fifth display area 108 between a condition wherein an hour meter is displayed and a condition wherein a trip meter is displayed, etc. Furthermore, when the display selector 109 and the adjacent selector 52 for selecting a driving mode are simultaneously pressed, the display screen of the liquid crystal display 101 switches from the standard screen 103 to a selection screen 110 (see FIG. 13B). As shown in FIG. 13B, the selection screen 110 comprises a first selection field 111 selecting display of information related to maintenance, a second selection field 112 selecting display of setting items related to time display, a third selection field 113 selecting display of information related to previously performed operations, and a fourth selection field 114 selecting switching to the standard screen 103.

In a condition wherein the selection screen 110 is displayed, upon each short pressing operation of the display selector 109, the parameter display control means 479 sequentially switches the display condition of the selection screen 110 between a condition of selection of the first selection field 111, a condition of selection of the second selection field 112, a condition of selection of the third selection field 113, and a condition of selection of the fourth selection field 114. Furthermore, upon a long pressing operation of the display selector 109, the selection at that time is confirmed, and the display screen of the liquid crystal display 101 switches to a screen 103, 115, 116, 117 (see FIG. 13A and FIGS. 13C to 13E) corresponding to the selection field 111, 112, 113, 114 for which selection was confirmed. In principle, the display screen of the liquid crystal display 101 changes to a maintenance information display screen 115 (see FIG. 13C) displaying information related to maintenance upon a long pressing operation of the display selector 109 in a condition wherein the first selection field 111 is selected. The display screen of the liquid crystal display 101 changes to a time setting screen 116 (see FIG. 13D) displaying setting items relating to time display upon a long pressing operation of the display selector 109 in a condition wherein the second selection field 112 is selected. The display screen of the liquid crystal display 101 changes to an operation information display screen 117 (see FIG. 13E) displaying information related to previously performed operations upon a long pressing operation of the display selector 109 in a condition wherein the third selection field 113 is selected. The display screen of the liquid crystal display 101 switches to the standard screen 103 (see FIG. 13A) upon a long pressing operation of the display selector 109 in a condition wherein the fourth selection field 114 is selected.

Figure 13C:
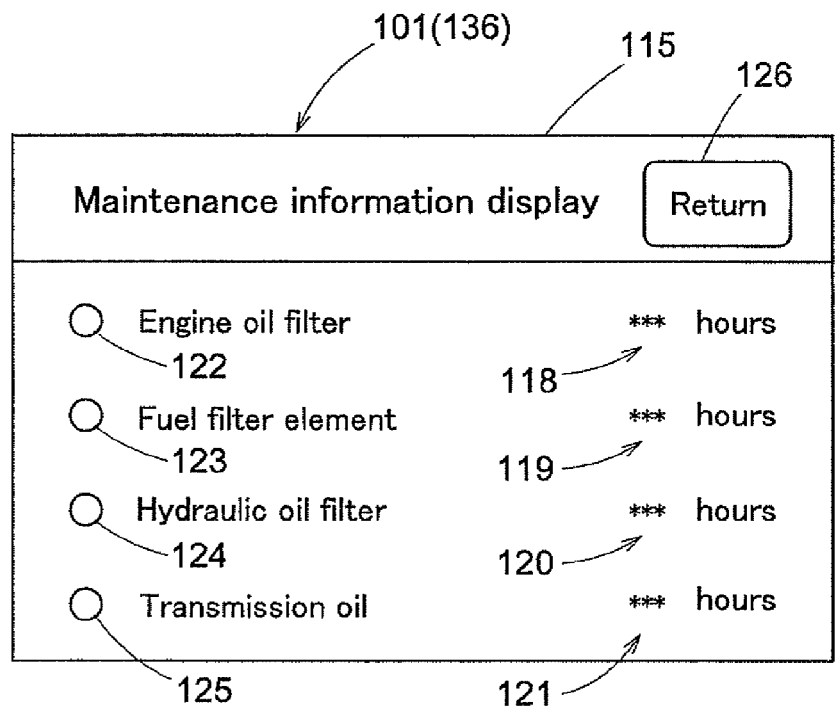
FIG. 13C is a screen view for explaining a display content of a liquid crystal display.

As shown in FIG. 13C, the maintenance information display screen 115 comprises a first display area 118 displaying a time elapsed since replacement of an engine oil filter (not shown), a second display area 119 displaying a time elapsed since replacement of a fuel filter element (not shown), a third display area 120 displaying a time elapsed since replacement of a hydraulic oil filter (not shown), a fourth display area 121 displaying a time elapsed since replacement of transmission oil, a first, second, third, and fourth selection field 122, 123, 124, 125 displaying a selection condition of the display areas 118, 119, 120, 121, and a fifth selection field 126 selecting switching to the selection screen 110.

In a condition wherein the maintenance information display screen 115 is displayed, upon each short pressing operation of the display selector 109, the parameter display control means 479 sequentially switches the display condition of the maintenance information display screen 115 between a condition of selection of the first display area 118, a condition of selection of the second display area 119, a condition of selection of the third display area 120, a condition of selection of the fourth display area 121, and a condition of selection of the fifth selection field 126. Furthermore, upon a long pressing operation of the display selector 109, control corresponding to the display condition of the maintenance information display screen 115 at that time is performed. In principle, the time elapsed since replacement of the engine oil filter is reset upon a long pressing operation of the display selector 109 in a condition wherein the first display area 118 is selected, and switching from the first display area 118 to another display area 119, 120, 121 or the fifth selection field 126 is possible using a short pressing operation of the display selector 109. The time elapsed since replacement of the fuel filter element is reset upon a long pressing operation of the display selector 109 in a condition wherein the second display area 119 is selected, and switching from the second display area 119 to another display area 118, 120, 121 or the fifth selection field 126 is possible using a short pressing operation of the display selector 109. The time elapsed since replacement of the hydraulic oil filter is reset upon a long pressing operation of the display selector 109 in a condition wherein the third display area 120 is selected, and switching from the third display area 120 to another display area 118, 119, 121 or the fifth selection field 126 is possible using a short pressing operation of the display selector 109. The time elapsed since replacement of the transmission oil is reset upon a long pressing operation of the display selector 109 in a condition wherein the fourth display area 121 is selected, and switching from the fourth display area 121 to another display area 118, 119, 120 or the fifth selection field 126 is possible using a short pressing operation of the display selector 109. The display screen of the liquid crystal display 101 switches to the selection screen 110 (see FIG. 13B) upon a long pressing operation of the display selector 109 in a condition wherein the fifth selection field 126 is selected. That is to say, by performing each of the above-explained reset operations in an appropriate manner after replacement of the engine oil filter or fuel filter element, etc., the corresponding elapsed time after replacement can be made correct. Furthermore, by displaying the maintenance information display screen 115 using an above-explained display switching operation, a replacement timing for the engine oil filter or fuel filter element, etc. can be accurately ascertained.

Figure 13D:
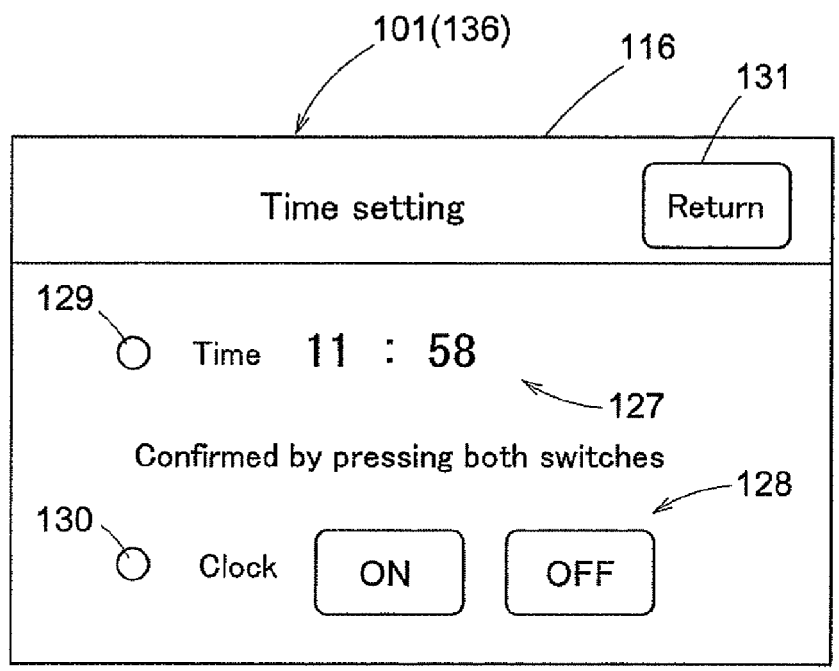
FIG. 13D is a screen view for explaining a display content of a liquid crystal display.

As shown in FIG. 13D, the time setting screen 116 comprises a first setting area 127 for time matching, a second setting area 128 for time display setting, a first selection field 129 and a second selection field 130 displaying a selection condition of the setting areas 127, 128, and a third selection field 131 for selecting switching to the selection screen 110.

In a condition wherein the time setting screen 116 is displayed, upon each short pressing operation of the display selector 109, the parameter display control means 479 sequentially switches the display condition of the time setting screen 116 between a condition of selection of the first setting area 127, a condition of selection of the second setting area 128, and a condition of selection of the third selection field 131. Furthermore, upon a long pressing operation of the display selector 109, the selection at that time is confirmed and control corresponding to the confirmed selection condition is performed. In principle, in a condition wherein the first setting area 127 is selected, the display condition of the first setting area 127 switches to a condition allowing time matching of an hours field upon a long pressing operation of the display selector 109. In this condition, the hour value of the hours field advances by one hour upon each short pressing operation of the selector 52 for selecting a driving mode, and upon a short pressing operation of the display selector 109, the hour value of the hours field at that time is confirmed and the display condition of the first setting area 127 changes from the condition allowing time matching of the hours field to a condition allowing time matching of a minutes field. In this condition, the minute value of the minutes field advances by one minute upon each short pressing operation of the selector 52 for selecting a driving mode, and upon a short pressing operation of the display selector 109, the minute value of the minutes field at that time is confirmed and the display condition of the first setting area 127 changes from the condition allowing time matching of the minutes field to a condition allowing time matching of the hours field. When the selector 52 for selecting a driving mode and the display selector 109 are simultaneously pressed in a condition wherein time matching is allowed, the set time at that time is confirmed as the current time, and selection can be switched from the first setting area 127 to the second setting area 128 or the third selection field 131 using a long pressing operation of the display selector 109.

The display condition of the second setting area 128 switches to a condition allowing modification of a time display setting upon a long pressing operation of the display selector 109 in a condition wherein the second setting area 128 is selected. Upon each short pressing operation of the display selector 109 in this condition, the display condition of the second setting area 128 switches between a condition wherein display of the clock is selected and a condition wherein non-display of the clock is selected. When the selector 52 for selecting a driving mode and the display selector 109 are simultaneously pressed in either of the selection conditions, the selection content at that time is confirmed, and selection can be switched from the second setting area 128 to the first setting area 127 or the third selection field 131 using a long pressing operation of the display selector 109. The display screen of the liquid crystal display 101 switches to the selection screen 110 (see FIG. 13B) upon a long pressing operation of the display selector 109 in a condition wherein the third selection field 131 is selected.

Figure 13E:
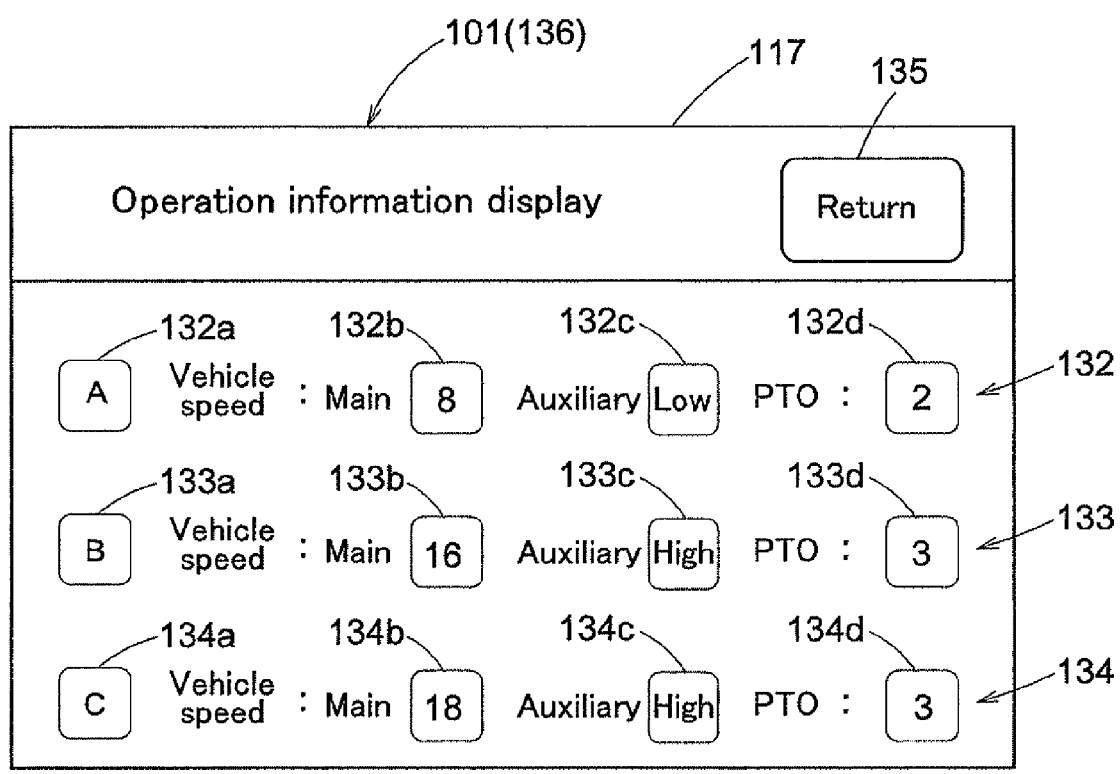
FIG. 13E is a screen view for explaining a display content of a liquid crystal display.

As shown in FIG. 13E, the operation information display screen 117 comprises a first information display area 132, and second information display area 133, a third information display area 134, and a selection field 135 for selecting switching to the selection screen 110. The information display areas 132, 133, 134 are provided with symbol display areas 132a, 133a, 134a presenting a symbol facilitating easy identification of the corresponding information display area, main speed-change stage display areas 132b, 133b, 134b displaying a forward-travel speed-change stage of the main speed-change device 14, auxiliary speed-change stage display areas 132c, 133c, 134c displaying a speed-change stage of the auxiliary speed-change device 15, and operation speed-change stage display areas 132d, 133d, 134d displaying a speed-change stage of the operating-power speed change device 20.

Pursuant to switching from the selection screen 110 to the operation information display screen 117, the parameter display control means 479 displays "A" in the symbol display area 132a of the first information display area 132 as a symbol facilitating easy identification thereof. The parameter display control means 479 displays "B" in the symbol display area 133a of the second information display area 133 as a symbol facilitating easy identification thereof. The parameter display control means 479 displays "C" in the symbol display area 134a of the third information display area 134 as a symbol facilitating easy identification thereof. Furthermore, in a case wherein display information corresponding to any of the speed-change range display areas 132b to 134d has been recorded in the memory 477 through an operation of the parameter display control means 479, the display information is read from the memory 477 and displayed in the corresponding speed-change range display areas 132b to 134d.

In a condition wherein the operation information display screen 117 is displayed, upon each short pressing operation of the display selector 109, the parameter display control means 479 sequentially switches the display condition of the operation information display screen 117 between a condition of selection of the first information display area 132, a condition of selection of the second information display area 133, a condition of selection of the third information display area 134, and a condition of selection of the selection field 135. Furthermore, upon a long pressing operation of the display selector 109, the selection at that time is confirmed and control corresponding to the confirmed selection condition is performed. In principle, upon a long pressing operation of the display selector 109 in a condition wherein the first information display area 132 is selected, the selection condition thereof is confirmed and the display condition of the first information display area 132 switches to a condition allowing modification of the display content of the main speed-change stage display area 132b. In this condition, the forward-travel speed-change stage of the main speed-change device 14 as displayed in the main speed-change stage display area 132b is sequentially switched between stages 1 to 12 upon each short pressing operation of the selector 52 for selecting a driving mode. Furthermore, the speed-change stage is confirmed upon a short pressing operation of the display selector 109 and the display condition of the first information display area 132 switches from the condition allowing modification of the display content of the main speed-change stage display area 132b to a condition allowing modification of the display content of the auxiliary speed-change stage display area 132c. In this condition, the speed-change stage of the auxiliary speed-change device 15 as displayed in the auxiliary speed-change stage display area 132c is sequentially switched between a low speed stage, a medium speed stage, and a high speed stage upon each short pressing operation of the selector 52 for selecting a driving mode. Furthermore, the speed-change stage is confirmed upon a short pressing operation of the display selector 109 and the display condition of the first information display area 132 switches from the condition allowing modification of the display content of the auxiliary speed-change stage display area 132c to a condition allowing modification of the display content of the operating speed-change stage display area 132d. In this condition, the speed-change stage of the operating-power speed change device 20 as displayed in the operating speed-change stage display area 132d is sequentially switched between stages 1 to 4 and Off upon each short pressing operation of the selector 52 for selecting a driving mode. Furthermore, the speed-change stage is confirmed upon a short pressing operation of the display selector 109 and the display condition of the first information display area 132 switches from the condition allowing modification of the display content of the operating speed-change stage display area 132d to a condition allowing modification of the display content of the main speed-change stage display area 132b. Upon a simultaneous long pressing operation of the display selector 109 and the selector 52 for selecting a driving mode in a condition wherein the first information display area 132 is selected, the display content in the first information display area 132 at that time is recorded in the memory 477, and a short pressing operation of the display selector 109 can then be used to switch from the first information display area 132 to the second information display area 133 or the third information display area 134.

In a condition wherein the second information display area 133 or the third information display area 134 is selected, if an operation similar to that executed in the above-explained condition of selection of the first information display area 132 is executed, then a control operation similar to that executed in the condition of selection of the first information display area 132 is executed accordingly. The display screen of the liquid crystal display 101 switches to the selection screen 110 (see FIG. 13B) upon a long pressing operation of the display selector 109 in a condition wherein the selection field 135 is selected.

With above-explained configuration, when a speed-change stage of the main speed-change device 14, a speed-change stage of the auxiliary speed-change device 15, and a speed-change stage of the operating-power speed change device 20 used upon execution of, for example, a tilling operation appropriate for a field are set in the first information display area 132 using the above-explained operations, the set speed-change stages (that is, operation parameters) are recorded in the memory 477. Accordingly, whenever executing a subsequent tilling operation in the same field, the display content recorded in the memory 477 can be read as operation parameters for achieving a tilling operation state appropriate for that field and displayed in the first information display area 132 using the above-explained operations.

Following this, a speed-change condition identical to that of the previously-executed tilling operation appropriate for the field can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the first information display area 132, and as a result thereof the rotary tilling device 3 can be driven at a drive speed appropriate for the field while driving the tractor 1 at a vehicle speed appropriate for the field.

In a case wherein double cropping is being carried out, a speed-change stage of the main speed-change device 14, a speed-change stage of the auxiliary speed-change device 15, and a speed-change stage of the operating-power speed change device 20 appropriate for a first-crop or spring tilling operation are set in the first information display area 132 and the set speed-change stages (that is, operation parameters) are recorded in the memory 477 using the above-explained operations, and furthermore, a speed-change stage of the main speed-change device 14, a speed-change stage of the auxiliary speed-change device 15, and a speed-change stage of the operating-power speed change device 20 appropriate for a second-crop or fall tilling operation are set in the second information display area 133 and the set speed-change stages (that is, operation parameters) are recorded in the memory 477 using the above-explained operations. Accordingly, whenever executing subsequent first-crop or spring tilling operations, the setting content for the first-crop or spring tilling operation as recorded in the memory 477 can be read as operation parameters for achieving an operation state appropriate for the first-crop or spring tilling operation and displayed in the first information display area 132 using the above-explained operations.

Following this, a speed-change condition appropriate for the first-crop or spring tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the first information display area 132. As a result thereof, the rotary tilling device 3 can be driven at a drive speed appropriate for the first-crop or spring tilling operation while driving the tractor 1 at a vehicle speed appropriate for the first-crop or spring tilling operation.

Furthermore, whenever executing subsequent second-crop or fall tilling operations, the setting content for the second-crop or fall tilling operation as recorded in the memory 477 can be read as operation parameters for achieving an operation state appropriate for the second-crop or fall operation and displayed in the second information display area 133 using the above-explained operations. Following this, a speed-change condition appropriate for the second-crop or fall tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the second information display area 133. As a result thereof, the rotary tilling device 3 can be driven at a drive speed appropriate for the second-crop or fall tilling operation while driving the tractor 1 at a vehicle speed appropriate for the second-crop or fall tilling operation.

In a case wherein double cropping is switched between similar and dissimilar crops, a speed-change stage of the main speed-change device 14, a speed-change stage of the auxiliary speed-change device 15, and a speed-change stage of the operating-power speed change device 20 appropriate for a first-crop or spring tilling operation are set in the first information display area 132 and recorded in the memory 477 using the above-explained operations, and furthermore, a speed-change stage of the main speed-change device 14, a speed-change stage of the auxiliary speed-change device 15, and a speed-change stage of the operating-power speed change device 20 appropriate for a second-crop tilling operation are set in the second information display area 133 and recorded in the memory 477 using the above-explained operations. Similarly, a speed-change stage of the main speed-change device 14, a speed-change stage of the auxiliary speed-change device 15, and a speed-change stage of the operating-power speed change device 20 appropriate for a fall tilling operation are set in the third information display area 134 and recorded in the memory 477 using the above-explained operations. Accordingly, whenever executing first-crop or spring tilling operations, the setting content for the first-crop or spring tilling operation as recorded in the memory 477 can be read as operation parameters for achieving an operation state appropriate for the first-crop or spring tilling operation and displayed in the first information display area 132 using the above-explained operations.

A speed-change condition appropriate for the first-crop or spring tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the first information display area 132. As a result thereof, the rotary tilling device 3 can be driven at a drive speed appropriate for the first-crop or spring tilling operation while driving the tractor 1 at a vehicle speed appropriate for the first-crop or spring tilling operation.

Furthermore, whenever executing second-crop tilling operations, the setting content for the second-crop tilling operation as recorded in the memory 477 can be read as operation parameters for achieving an operation state appropriate for the second-crop tilling operation and displayed in the second information display area 133 using the above-explained operations. Following this, a speed-change condition appropriate for the second-crop tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the second information display area 133. As a result thereof, the rotary tilling device 3 can be driven at a drive speed appropriate for the second-crop tilling operation while driving the tractor 1 at a vehicle speed appropriate for the second-crop tilling operation.

Furthermore, whenever executing fall tilling operations, the setting content for the fall tilling operation as recorded in the memory 477 can be read as operation parameters for achieving an operation state appropriate for the fall tilling operation and displayed in the third information display area 134 using the above-explained operations. Following this, a speed-change condition appropriate for the fall tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the third information display area 134. As a result thereof, the rotary tilling device 3 can be driven at a drive speed appropriate for the fall tilling operation while driving the tractor 1 at a vehicle speed appropriate for the fall tilling operation.

In a case wherein a vehicle speed and a rotation speed of the operating-power take-off shaft 21 appropriate for a tilling operation are dissimilar to a vehicle speed and a rotation speed of the operating-power take-off shaft 21 appropriate for a soil-puddling operation, a speed-change stage of the main speed-change device 14, a speed-change stage of the auxiliary speed-change device 15, and a speed-change stage of the operating-power speed change device 20 appropriate for the tilling operation (that is, operation parameters) are set in the first information display area 132 and recorded in the memory 477 using the above-explained operations, and a speed-change stage of the main speed-change device 14, a speed-change stage of the auxiliary speed-change device 15, and a speed-change stage of the operating-power speed change device 20 appropriate for the soil-puddling operation are set in the second information display area 133 and recorded in the memory 477 using the above-explained operations. As a result thereof, whenever executing subsequent tilling operations, the setting content for the tilling operation as recorded in the memory 477 can be read as operation parameters for achieving an operation state appropriate for the tilling operation and displayed in the first information display area 132 using the above-explained operations.

Then, a vehicle speed and rotation speed of the operating-power take-off shaft 21 appropriate for the tilling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the first information display area 132. As a result thereof, the rotary tilling device 3 can be driven at a drive speed appropriate for the tilling operation while driving the tractor 1 at a vehicle speed appropriate for the tilling operation.

Furthermore, whenever executing subsequent soil-puddling operations, the setting content for the soil-puddling operation as recorded in the memory 477 can be read as operation parameters for achieving an operation state appropriate for the soil-puddling operation and displayed in the second information display area 133 using the above-explained operations. Then, a vehicle speed and rotation speed of the operating-power take-off shaft 21 appropriate for the soil-puddling operation can be reliably, easily, and quickly achieved by setting the speed-change stage of the main speed-change device 14, the speed-change stage of the auxiliary speed-change device 15, and the speed-change stage of the operating-power speed change device 20 so as to become the same as the display content of the second information display area 133. As a result thereof, a soil-puddling device connected in place of the rotary tilling device 3 at the rear section of the tractor 1 is driven at a drive speed appropriate for the soil-puddling operation while driving the tractor 1 at a vehicle speed appropriate for the soil-puddling operation.

It should be noted that the operation parameter display system can be configured such that weather information upon execution of operations, the actual duration of operations with the working implement, the number of elevation operations of the working implement, or the number of speed-change operations of the speed-change devices 14, 15, 20, etc. are recorded and displayed as required using the above-explained memory display functionality.

Other Embodiments

1. The working vehicle can be configured such that an working implement such as a plow, a furrow opener, or a levee plastering machine, etc. is connected to a rear section of the tractor 1. Furthermore, the working vehicle can also be configured such that an working implement such as a loader or a fork device, etc, is connected to a front section of the tractor 1. The working vehicle can also be configured as a ride-on lawn mower, a ride-on planter, or a combine harvester, etc.

2. Instead of the selector 52 for selecting a driving mode, the display selector 109, or both thereof, another existing switch can be utilized or a dedicated device for setting operation parameters such as a switch, etc. can be provided.

3. In a case where the speed-change stage of the main speed-change device 14, the speed-change stage of the auxiliary speed-change device 15, and the speed-change stage of the operating-power speed change device 20 constitute operation parameters necessary for achieving a prescribed operation state, the parameter setting means 475 can be configured so as to make settings based on detection signals from the main speed change lever 30 and the second lever sensor 50 detecting an operation position thereof, the auxiliary speed change lever 31 and the third lever sensor 51 detecting an operation position thereof, and the operating-power speed change lever 36 and the fifth lever sensor 100 detecting an operation position thereof.

With this configuration, operating positions of the speed change levers 30, 31, 36 as detected by the lever sensors 50, 51, 100 during operation are, based on commands from the parameter recording means 476, stored in the memory 477 as parameters required for achieving the prescribed operation state. Furthermore, this embodiment of the operation parameter display system can be further configured such that operating positions of the speed change levers 30, 31, 36 detected for the longest periods of time during operation by the lever sensors 50, 51, 100 are automatically stored in the memory 477 as parameters required for achieving the prescribed operation state. In such a case, operation times in each of the operation positions of the speed change levers 30, 31, 36 can be determined based on a timer performing time measurement and detection values of the lever sensors 50, 51, 100.

4. Instead of the selector 52 for selecting a driving mode, the display selector 109, or both thereof, another existing switch can be utilized or a dedicated device for issuing memory instructions such as a switch, etc. can be provided.

5. Instead of the selector 52 for selecting a driving mode, the display selector 109, or both thereof another existing switch can be utilized or a dedicated device for issuing display instructions such as a switch, etc. can be provided.

6. In a case where the speed-change stage of the main speed-change device 14, the speed-change stage of the auxiliary speed-change device 15, and the speed-change stage of the operating-power speed change device 20 are employed as operation parameters necessary for achieving a prescribed operation state, the operation parameter display system can be configured such that display lamps such as LEDs are provided at the operation positions of the speed change levers 30, 31, 36 corresponding to the speed-change stages thereof and that the display lamps corresponding to the operation parameters set by the parameter setting means 475 are turned on or flashed in response to control commands based on commands from the parameter display control means 479.

7. A dedicated display device can be provided in order to display operation parameters. Furthermore, the operation parameter display system can be configured such that the symbol display areas 132*a*, 133*a*, 134*a* displaying operation parameters can display and allow selection of spring, fall, rice, wheat, barley, tilling, or soil puddling, etc., and operating content for each operation parameter can be accurately and reliably displayed.

8. An engine speed can be added to the operation parameters necessary for achieving a prescribed operation state as an operation parameter related to vehicle speed during operation and drive of the working implement.

9. An operation parameter related to elevation of an working implement such as the rotary tilling device 3, etc. can be added to the operation parameters necessary for achieving a prescribed operation state. In such a case, an operating height of the working implement from a ground surface during an operation, a type of automatic mode selected, whether or not the raised turning mode is selected, and whether or not the raised reverse mode is selected, etc. constitute operation parameters related to elevation of the working implement, and it is believed that one, a plurality, or all thereof can be added to the operation parameters necessary for achieving a prescribed operation state.

10. An operation parameter related to rolling of an working implement such as the rotary tilling device 3, etc. can be added to the operation parameters necessary for achieving a prescribed operation state. In such a case, a type of rolling control mode selected and a type of rolling correction control mode selected, etc. constitute operation parameters related to rolling of the working implement, and it is believed that one, a plurality, or all thereof can be added to the operation parameters necessary for achieving a prescribed operation state.

11. A type of driving mode selected can be added to the operation parameters necessary for achieving a prescribed operation state.

12. In a case wherein an working implement such as a fertilization device or a chemical distribution device, etc. is connected to a rear section of the tractor 1, a fertilizer volume or a chemical distribution volume, etc. can be added to the operation parameters necessary for achieving a prescribed operation state.

What is claimed is:

1. An operation parameter display system for a working vehicle fitted with a working implement, comprising:
   a parameter setting controller setting a group of operation parameters appropriate for the working implement and the working vehicle for each state of an operation executed by the working vehicle in response to an operation input from a manual operation input device;
   a parameter recording controller storing the set group of operation parameters in a memory in response to the operation input from the operation input device, the parameter recording controller storing the group of operation parameters in the memory categorized for different operation states; and
   a parameter display controller displaying the group of parameters stored in the memory on a display device in response to the operation input from the operation input device, the parameter display controller displaying the group of operation parameters on the display device categorized for different operation states.

2. The operation parameter display system of claim 1, wherein:
   the group of operation parameters includes a parameter related to a vehicle speed of the working vehicle and a parameter related to driving of the working implement.

3. The operation parameter display system of claim 1, wherein:
   the working implement is provided so as to be capable of vertical motion with respect to the working vehicle; and the group of operation parameters also includes a parameter related to the vertical motion of the working implement.

4. The operation parameter display system of claim 2, wherein:
   the working implement is provided so as to be capable of rolling with respect to the working vehicle; and the group of operation parameters also includes a parameter related to the rolling of the working implement.

* * * * *

UNITED STATES PATENT AND TRADEMARK OFFICE
CERTIFICATE OF CORRECTION

PATENT NO.       : 8,160,784 B2                                   Page 1 of 1
APPLICATION NO.  : 12/236134
DATED            : April 17, 2012
INVENTOR(S)      : Toshiya Fukumoto It is certified that error appears in the above-identified patent and that said Letters Patent is hereby corrected as shown below:

Column 26, Line 49, Claim 3, delete "claim 1" and insert -- claim 2 --

Signed and Sealed this
Thirty-first Day of July, 2012

David J. Kappos
*Director of the United States Patent and Trademark Office*